US009921421B2

(12) United States Patent
Branda et al.

(10) Patent No.: US 9,921,421 B2
(45) Date of Patent: *Mar. 20, 2018

(54) OPTICAL FILTER COMPRISING A VARIABLE TRANSMITTANCE LAYER

(71) Applicant: Switch Materials Inc., Burnaby (CA)

(72) Inventors: Neil Robin Branda, Burnaby (CA); Zachary Bryce Erno, Burnaby (CA); Jeremy Graham Finden, Burnaby (CA); Duhane Lam, Burnaby (CA); Charles Joseph Gongming Loo, Burnaby (CA); Jonathan Ross Sargent, Burnaby (CA); Matthew Paul Smit, Burnaby (CA); Peter Alexander Von Hahn, Burnaby (CA); Douglas Malcolm Wiggin, Burnaby (CA)

(73) Assignee: Switch Materials, Inc., Burnaby (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/409,196

(22) Filed: Jan. 18, 2017

(65) Prior Publication Data

US 2017/0192257 A1     Jul. 6, 2017

Related U.S. Application Data

(63) Continuation of application No. 14/404,581, filed as application No. PCT/CA2013/000522 on May 29, 2013, now Pat. No. 9,588,358.

(Continued)

(51) Int. Cl.
    *G02F 1/01*     (2006.01)
    *G02B 5/22*    (2006.01)
(Continued)

(52) U.S. Cl.
    CPC ...... *G02F 1/0102* (2013.01); *B32B 17/10486* (2013.01); *B32B 17/10513* (2013.01);
(Continued)

(58) Field of Classification Search
    USPC ............... 359/238, 239, 722, 642, 885, 891
    See application file for complete search history.

(56) References Cited

U.S. PATENT DOCUMENTS

| 5,115,346 A | 5/1992 | Lynam |
| 5,753,146 A | 5/1998 | Van Gemert et al. |

(Continued)

FOREIGN PATENT DOCUMENTS

| CN | 101313236 A | 11/2008 |
| CN | 102460291 A | 5/2012 |

OTHER PUBLICATIONS

Notification of Reasons for Rejection, dated Apr. 4, 2017, for corresponding Japanese Application No. 2015-514300, 12 pages. (with English Translation).

(Continued)

*Primary Examiner* — Mohammed Hasan
(74) *Attorney, Agent, or Firm* — Seed IP Law Group LLP

(57) ABSTRACT

A optical filter comprising a variable transmittance layer having a first spectrum in a dark state, and a second spectrum in a faded state; and a color balancing layer having a third spectrum; each of the first, second and third spectra comprising a visible portion; the first and third spectra combining to provide a dark state spectrum approximating a dark state target color; and the second and third spectra combining to provide a fades state spectrum approximating a faded state target color. The optical filter may further comprise a light attenuating layer. The optical filter may further comprise part of a laminated glass.

20 Claims, 21 Drawing Sheets

Related U.S. Application Data

(60) Provisional application No. 61/652,466, filed on May 29, 2012, provisional application No. 61/766,613, filed on Feb. 19, 2013.

(51) Int. Cl.
  *G02B 5/23* (2006.01)
  *G02B 5/20* (2006.01)
  *G02C 7/10* (2006.01)
  *G02F 1/17* (2006.01)
  *B32B 17/10* (2006.01)
  *E06B 9/24* (2006.01)
  *B60J 3/04* (2006.01)

(52) U.S. Cl.
  CPC .. *B32B 17/10633* (2013.01); *B32B 17/10761* (2013.01); *B60J 3/04* (2013.01); *E06B 9/24* (2013.01); *G02B 5/208* (2013.01); *G02B 5/23* (2013.01); *G02C 7/101* (2013.01); *G02C 7/102* (2013.01); *G02F 1/17* (2013.01); *B32B 2307/402* (2013.01); *B32B 2307/42* (2013.01); *B32B 2419/00* (2013.01); *B32B 2551/00* (2013.01); *B32B 2605/08* (2013.01); *E06B 2009/2417* (2013.01); *G02F 2203/48* (2013.01)

(56) References Cited

U.S. PATENT DOCUMENTS

| | | | |
|---|---|---|---|
| 6,020,987 A | 2/2000 | Baumann et al. | |
| 6,055,088 A | 4/2000 | Fix et al. | |
| 6,271,968 B1* | 8/2001 | Dobrowolski | G02B 27/283 359/485.06 |
| 6,466,298 B1 | 10/2002 | Fix et al. | |
| 7,342,706 B2 | 3/2008 | Shinohara et al. | |
| 8,360,574 B2 | 1/2013 | Ishak et al. | |
| 2002/0118437 A1 | 8/2002 | Rukavina et al. | |
| 2005/0104408 A1 | 5/2005 | Capps | |
| 2007/0216861 A1 | 9/2007 | Ishak et al. | |
| 2010/0315693 A1* | 12/2010 | Lam | G02B 5/23 359/241 |
| 2011/0211251 A1 | 9/2011 | Kim et al. | |
| 2011/0250531 A1 | 10/2011 | Kwon et al. | |
| 2012/0008217 A1 | 1/2012 | Ishak et al. | |
| 2012/0044560 A9* | 2/2012 | Lam | G02B 5/23 359/241 |
| 2012/0081779 A1 | 4/2012 | Paolini, Jr. et al. | |

OTHER PUBLICATIONS

Chinese Office Action, dated May 25, 2016, for Chinese Application No. 201380040287.4, 5.
Chinese Office Action, dated May 25, 2016, for Chinese Application No. 201380040287.4, 2 pp.. (English Translation).
Chinese Search Report, dated May 17, 2016, for Chinese Application No. 201380040287.4, 2 pp.
Chinese Search Report, dated May 17, 2016, for Chinese Application No. 201380040287.4, 2 pages. (English Translation).
Decision of Rejection, dated Feb. 15, 2017, for Chinese Application No. 201380040287.4, 11 pages. (with English Translation).
Extended European Search Report, dated Jan. 7, 2016, for EP Application No. 13796243.7-1308 / 2856222, 5 pages.
PCT Application No. PCT/CA2013/000522, International Search Report and Written Opinion, dated Sep. 18, 2013.
Written Opinion of the Chinese Patent Office, for Chinese Application No. 201380040287.4, 7 pages.
Chinese Office Action, dated Jul. 17, 2017, for Chinese Application No. 201380040287.4, 6 pages (with English translation).

* cited by examiner

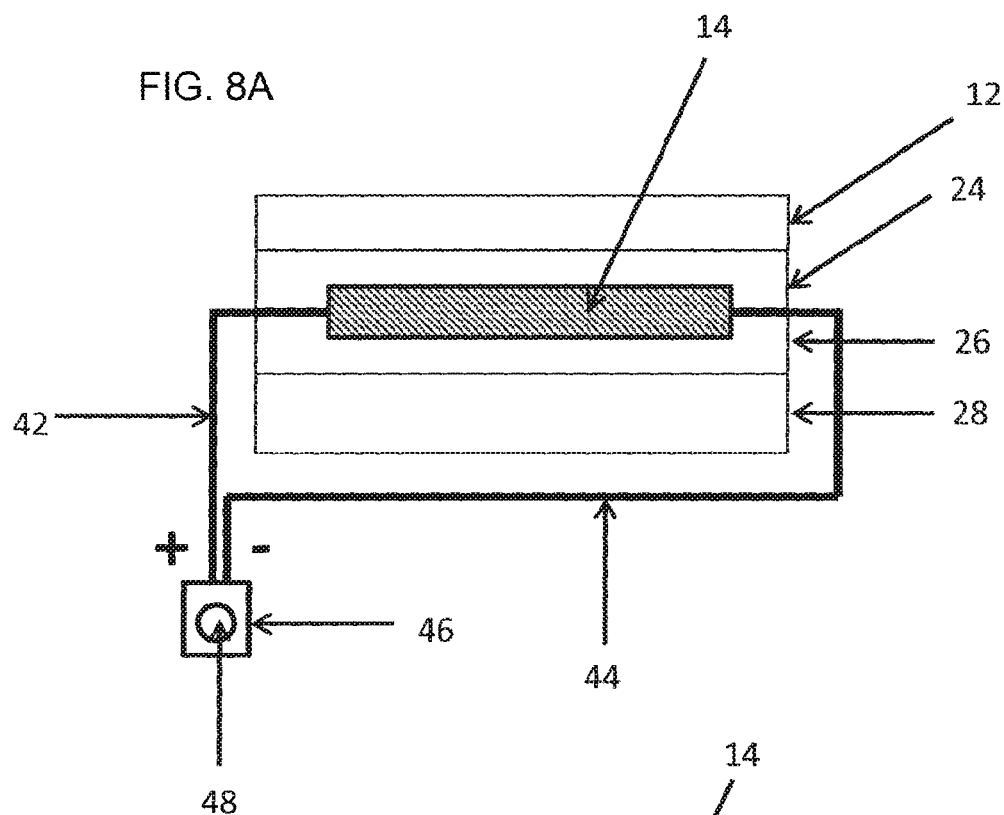
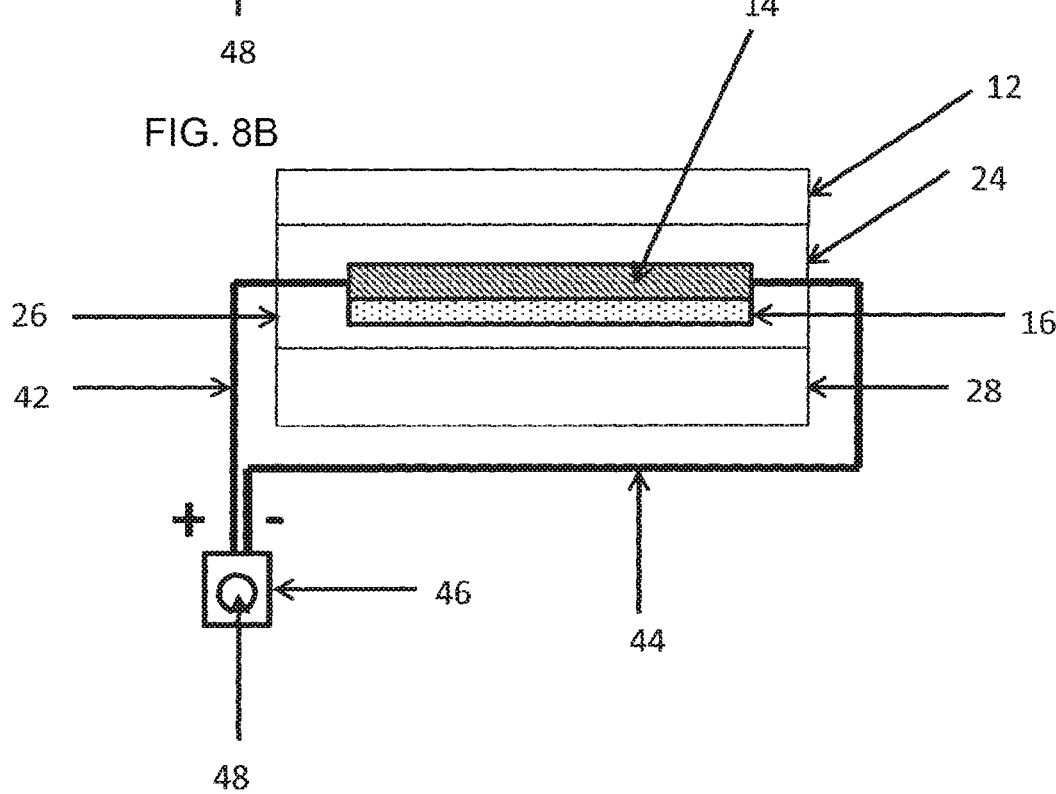

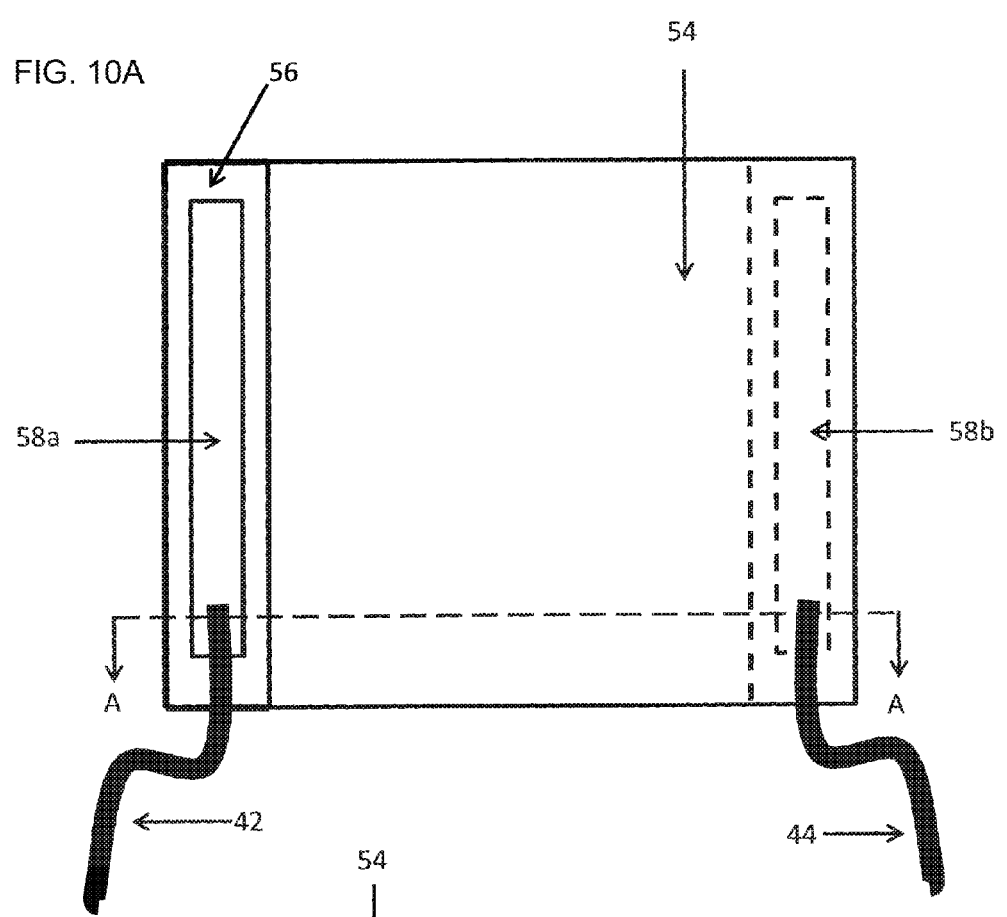
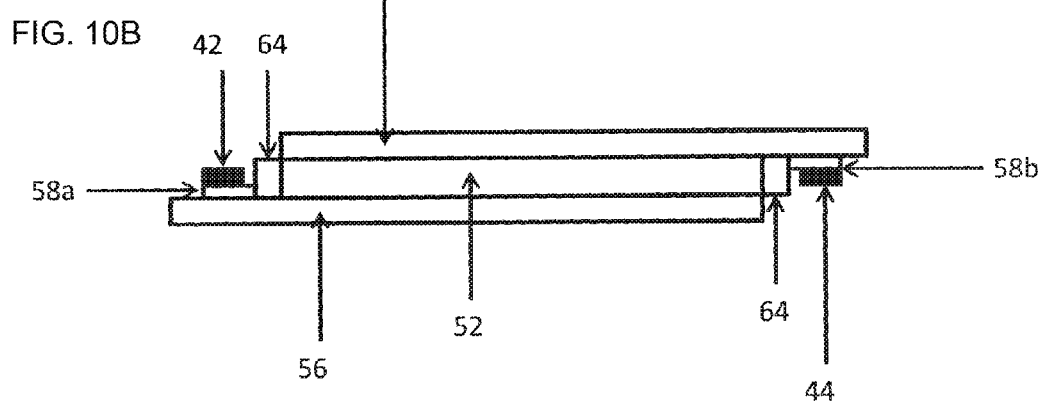

FIG. 13
Stack A
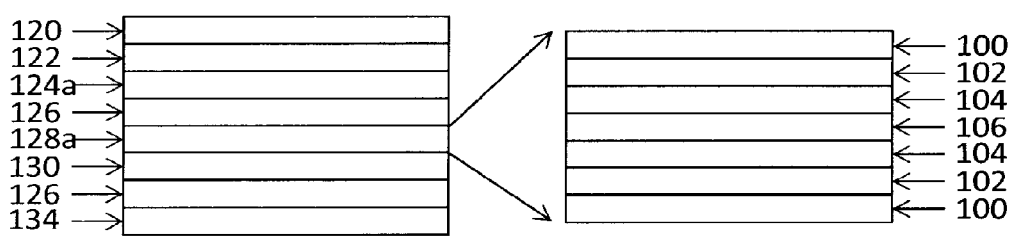
Stack B
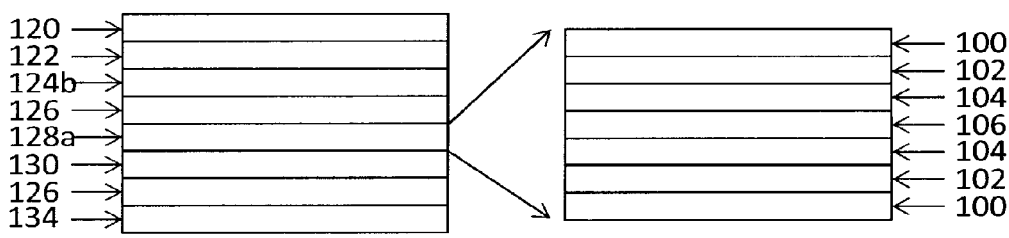
Stack C
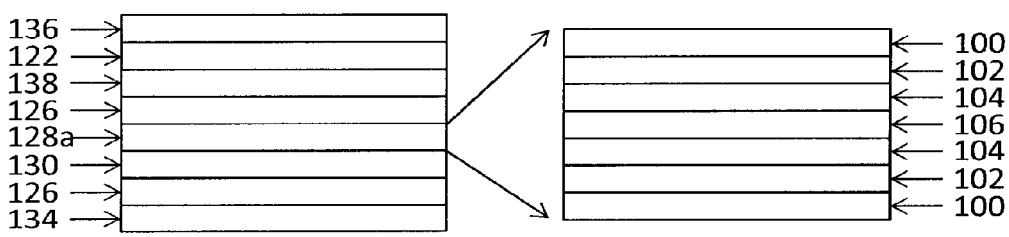

FIG. 13 continued
Stack D
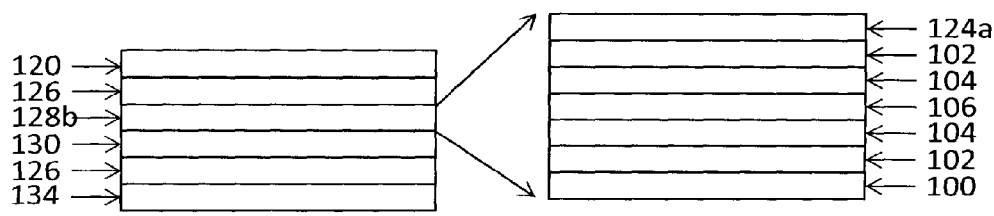
Stack E
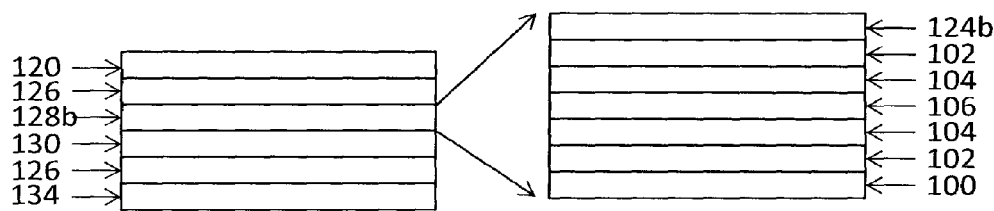
Stack F
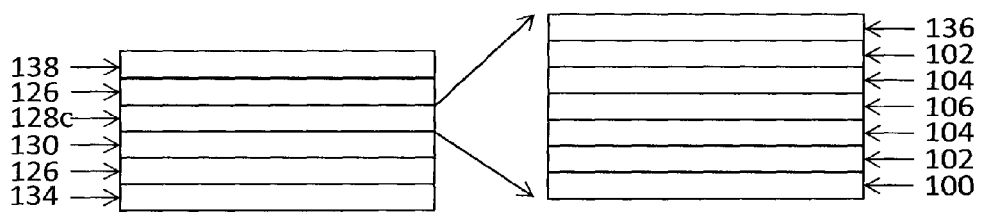
Stack G
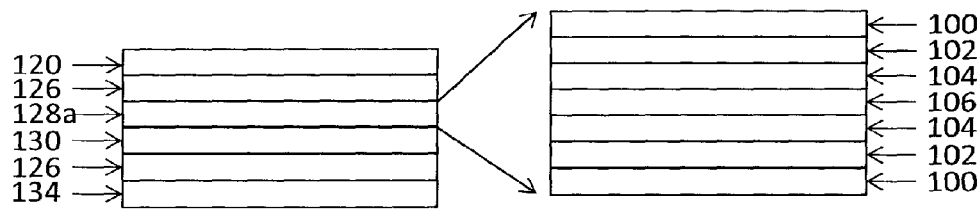

OPTICAL FILTER COMPRISING A VARIABLE TRANSMITTANCE LAYER

RELATED CASES

This application is the US national stage of PCT/CA2013/000522, filed May 29, 2013, which claims the benefit of priority to U.S. Provisional Applications No. 61/652,466 filed May 29, 2012, and 61/766,613 filed Feb. 19, 2013; the disclosures of each of which are incorporated herein by reference in their entirety.

TECHNICAL FIELD

The present disclosure relates generally to optical filters. The optical filter may comprise a variable transmittance layer and a color balancing layer.

BACKGROUND

Variable transmittance optical filters may employ a variety of technologies to alter visible light transmittance. Generally, such filters may be switched between a state of higher light transmittance (faded or light state) to a state of lower light transmittance (dark state) with the application, removal or reduction of a stimulus such as UV light, temperature and/or a voltage. Examples include photochromics, electrochromics, thermochromics, liquid crystals or suspended particles. Some photochromic materials may darken in response to light, frequently ultraviolet light, and may return to a faded state when the UV light is removed or reduced. Some electrochromic materials may darken in response to application of a voltage, and may return to a faded state once the voltage is removed; alternately, some electrochromic materials may darken in response to application of a voltage of a first polarity, and fade when a voltage of an opposite polarity is applied. Some thermochromic materials may darken proportionately in response to a temperature increase—for example, the warmer the material, the darker it can become. The thermochromic material may return to a faded state when the temperature decreases. Liquid crystal materials and suspended particle devices comprise crystals or particles that alter orientation in response to application of a voltage. In the absence of a voltage, the crystals or particles are randomly oriented, and scatter incident light, thus appearing opaque, or transmit very little light. When a voltage is applied, the crystals or particles are aligned with the electric field, and light may be transmitted. Where the variable transmittance optical filter includes an electrochromic aspect, the variable transmittance optical filter may comprise electrical connectors for connecting the optical filter to a control circuit, the control circuit to provide power to the optical filter to effect an electrochromic color change.

Depending on the nature of the variable optical filter and its use, further attenuation of the transmitted light or solar energy may be desirable. Where the variable transmittance optical filter is used on the window of a vehicle, aircraft or building, reducing or blocking transmission of infrared light may be useful to control the heat gain, and reducing or blocking transmission of ultraviolet light may be useful to protect occupants in the vehicle or building. Where impact protection is desirable, inclusion of laminated glass ("safety glass") in the window may be useful.

U.S. Pat. No. 4,244,997 and US 2009/0303581 describe a laminated glass with a shade band and U.S. Pat. No. 7,655,314 describes a laminated glass with an interlayer comprising an IR blocking component, and a coloring agent to complement the yellow-green appearance of the IR blocking component, but does not address how the color may be manipulated in a window with variable light transmission in the visible range. Tinted glass in grey, bronze or green tones may also be used to attenuate the light transmitted through a window. Some tints may attenuate light approximately equally across the visible spectrum, and while this may be effective in reducing the overall glare, it may not provide for color "correction" to a neutral tone if a component of the laminated glass itself has a color, and additional color correction may be needed.

Some examples of windows of vehicles that may alter light transmission or opacity with electricity are known—the Magic Sky™ automotive sunroof is one example of automotive glass that switches from an opaque state to a transparent state with the application of electricity. The switchable layer (suspended particle thin film) is applied to the sunroof glass and connected to the vehicle's electrical system. U.S. Pat. No. 6,995,891 describes an electrochromic safety glazing comprising an electrolyte interlayer with a polymeric binder for lamination of the substrates.

Where the laminated glass has a variable transmittance component, the degree of light transmission in one or both of the faded and dark states may be too great, or of a distorted color. Previously, colour balancing of glazing products such as automotive sunroofs and architectural windows was accomplished by altering the chemical composition of the glass itself to provide the desired colour, or by including a coloured interlayer (e.g. PVB) in between two sheets of glass. Altering the colour of the variable transmittance filter is much more difficult because the materials used for producing the variable transmittance cannot easily be changed to different colors while maintaining all of the variable transmittance properties. For example, some variable transmittance filters are blue in colour, which may be suitable for some applications but not others. Currently, the color of the overall product is determined by the color of the variable transmittance filter, even if that color is not seen as the most desirable by customers and potential customers of the product. Inclusion of one or more additional visible light filters may further attenuate the transmitted light, but may also distort the color or exacerbate an already distorted color.

SUMMARY

The present disclosure relates to an multi-layer composition comprising a variable transmittance layer and a color balancing layer selected to combine with the color of the variable transmittance layer in order to achieve a desired colour for the overall stack. A laminated glass with variable light transmittance, and color balancing layer to provide a target (e.g., neutral) color in a faded state, a dark state or both a faded and dark state may be a useful addition over the art, and be used in automotive windows (windshields, sunroofs, moonroofs, windows, backlites, sidelites or the like), architectural applications, ophthalmic devices or applications, or the like.

In accordance with one aspect, there is provided an multi-layer composition comprising a variable transmittance layer having a first color in a dark state, and a second color in a faded state; and a color balancing layer having a color complementary to a colored state of the variable transmittance layer. The color balancing layer may have a color complementary to the first color, the second color, or the first and the second color of the variable transmittance layer. The color balancing layer, together with the variable transmittance layer in a dark state or a faded state, or a dark state and a faded state, have a third desired colour (e.g., a neutral color). The variable transmittance layer and color balancing layer may be laminated inside a polymer layer. The variable transmittance layer comprises a switchable film, an electrochromic material, a photochromic material, a suspended particle layer or a liquid crystal layer.

In accordance another aspect, there is provided a multi-layer composition comprising a variable transmittance layer comprising a variable transmittance optical filter having a first spectrum in a dark state, and a second spectrum in a faded state; and a color balancing layer having a spectrum; each spectrum comprising a UV portion, a visible portion and an IR portion; and the spectra of the layers combining to provide a color of the multi-layer composition approximating a target color. One or more color balancing layers may be inboard of the variable transmittance layer.

In accordance with another aspect, there is provided a method of preparing a multi-layer composition approximating a target color, comprising: providing a variable transmittance layer comprising a variable transmittance optical filter having a first spectrum in a dark state, and a second spectrum in a faded state; selecting a color balancing layer having a spectrum; and combining the variable transmittance layer and color balancing layer in a stack approximating the target color.

In accordance with another aspect, there is provided an optical filter comprising a variable transmittance layer having a first color in a dark state, and a second color in a faded state; and a color balancing layer; the first color and color balancing layer combining to provide a dark state color approximating a dark state target color; and the second color and color balancing layer combining to provide a faded state color approximating a faded state target colour.

In accordance with another aspect, there is provided an optical filter comprising a variable transmittance layer having a first spectrum in a dark state, and a second spectrum in a faded state; and a color balancing layer having a third spectrum; each of the first, second and third spectra comprising a visible portion; the first and third spectra combining to provide a dark state spectrum approximating a dark state target color; and the second and third spectra combining to provide a faded state spectrum approximating a faded state target colour.

In accordance with another aspect, there is provided a method of preparing an optical filter approximating a target color, comprising: providing a variable transmittance layer having a first spectrum in a dark state, and a second spectrum in a faded state; selecting a color balancing layer having a third spectrum; and combining the variable transmittance layer and color balancing layer in a stack approximating the target color in the faded state, the dark state or both the faded state and the dark state.

In some aspects, the color balancing layer is inboard of the variable transmittance layer.

In some aspects, the optical filter may further comprise a light attenuating layer. The light attenuating layer may be outboard of the variable transmittance layer.

In some aspects, the variable transmittance layer comprises a switching material transitionable from a faded state to a dark state when exposed to electromagnetic radiation, and from a dark state to a faded state with application of a voltage. The electromagnetic radiation may comprise a component with a wavelength of 450 nm or less. The electromagnetic radiation may comprise a component with a wavelength of between 400 and 450 nm. The voltage applied may be from about 1.1 to about 2.5 V, or any amount or range therebetween.

In some aspects, the variable transmittance layer comprises a switchable film. The switchable film may comprise a switching material. The switching material may be part of a switchable film, the film comprising a first and a second transparent substrate, a first and second electrode disposed on a surface of the first, second or first and second substrate and a switching material disposed between the first and second substrates and in contact with the first and second electrodes. The switching material may comprise a thermoset polymer, an ionic medium and one or more photochromic/electrochromic compounds, the switching material transitionable from a faded state to a dark state when exposed to electromagnetic radiation, and from a dark state to a faded state with application of a voltage.

In some aspects, the color of the optical filter is a neutral color in the dark state, the faded state, or both the dark state and the faded state. In some aspects, the variable transmittance layer and color balancing layer are encapsulated in a polymer. The optical filter may further comprise an infrared (IR)-blocking component, an ultraviolet (UV) blocking component, or a UV blocking component and an IR blocking component.

In some aspects, the optical filter may comprise an $LT_A$ in a dark state of less than about 15%, or less than about 10%, or less than about 5%, or less than about 2%, or less than about 1%; and/or an $LT_A$ in a faded state of greater than about 5%, or greater than about 10%, or greater than about 15%, or greater than about 20%; and/or a contrast ratio of at least 5, at least 10 or at least 20. In some aspects, the optical filter may comprise a light transmission value of 1% or less in the dark state and 6% or higher in the light state, or of 5% or less in the dark state and 15% or higher in the light state.

In some aspects, the target color of the dark state and color of the optical filter in the dark state provide a delta C value of from about 0 to about 20; and/or a delta E value of from about 0 to about 20. In some aspects, the target color of the faded state and color of the optical filter in the faded state provide a delta C value of from about 0 to about 20; and/or a delta E value of from about 0 to about 20.

In some aspects there is provided a laminated glass, an automotive glazing, an ophthalmic device or an architectural glazing comprising an optical filter.

The color of the optical filter may be a neutral color in a dark state, a faded state, or both a dark state and a faded state. The color balancing layer may have a color complementary to the first color, the second color, or the first and the second color of the variable transmittance layer. The variable transmittance layer and color balancing layer may be laminated inside a polymer layer.

The optical filter or laminated glass may further comprise an IR-blocking component and/or a UV blocking component; the IR blocking component and/or a UV blocking component may be outboard of the variable transmittance layer. Where a light attenuating layer is present, the IR blocking component and/or the UV blocking component may be inboard, or outboard, of the light attenuating layer. In some aspects, the UV blocking layer may be a light attenuating layer.

To provide an optical filter with one or more of a selected contrast ratio, dark state color, or light transmittance, a variable transmittance layer and a color balance layer may be combined with one or more of a light attenuation layer, UV blocking layer (e.g. a cutoff filter of a selected wavelength), an infrared blocking layer or the like. A color balance layer may be selected to absorb light in the region of the spectrum where the variable transmittance layer has a lesser absorbance. Depending on the intended application, it may be preferable to achieve a darker dark state; for such an embodiment, and optical filter may include a grey glass or grey film light attenuating layer. This may reduce light transmittance in a faded state, therefore if maximum contrast ratio is desired (a lighter faded state and a darker dark state), a color balancing layer that selectively complements the spectrum of the variable transmittance layer may be preferable to a grey glass or grey film. Where increasing weathering durability is preferred, inclusion of a cutoff filter of 420 nm or greater in an optical filter may be useful. In some aspects this may provide a further advantage of a greater light transmittance in the dark state.

This summary does not necessarily describe the entire scope of all aspects. Other aspects, features and advantages will become apparent to those of ordinary skill in the art upon review of the following description of specific embodiments.

BRIEF DESCRIPTION OF THE DRAWINGS

These and other features will become more apparent from the following description in which reference is made to the appended drawings. The figures are for illustrative purposes, and unless indicated otherwise, may not show relative proportion or scale.

FIGS. 8A and 8B show schematic views of an apparatus according to other embodiments.

FIG. 10A shows a schematic diagram of the cut edges, busbar and electrical leads for a variable transmittance layer as a top view, and FIG. 10B shows a sectional view of that schematic along line A-A, according to another embodiment.

FIG. 13 shows the configuration of various optical filters, according to another embodiment.

DETAILED DESCRIPTION

There is provided, in part, a optical filter comprising a variable transmittance layer having a first spectrum in a dark state, and a second spectrum in a faded state' and a color balancing layer having a spectrum; each spectrum comprising an ultraviolet (UV) portion, a visible portion and an infra-red (IR) portion; and the spectra of the layers combining to provide a color of the optical filter approximating a target color. There is further provided, in part, a laminated glass comprising such a optical filter.

Optical filters according to various embodiments may have low power requirements for switching between dark and faded states. The optical filter may be useful for a variety of applications such as opthalmic devices (e.g. visors, masks, goggles, lenses, eyeglasses (prescription or not) or the like), architectural windows, vehicle windows and glazings (including windshields, side lite, side or rear windows), and vehicle sunroofs of various types including pop-up, spoiler, inbuilt, folding sunroofs, panoramic roof systems or removable roof panels. The optical filter may demonstrate relatively rapid switching between dark and light states, which may be advantageous in applications where frequent or rapid changes in lighting conditions occur. The optical filters may be stable and exhibit minimal change in light transmittance in response to temperature, which may be advantageous in applications where frequent or rapid changes in temperature conditions occur. The optical filters may exhibit photostability and durability suitable for use in various applications, including those referenced herein, and may be cycled between light and dark states many times. In some embodiments, the optical filter may be incorporated into a mirror or display. The light transmittance of the optical filter may be varied to control the amount of light reaching the mirror, reflected by the mirror, or both, or to control the amount of light emitted by the display. There is further provided, in part, for an automotive glazing or architectural glazing, comprising the optical filter. The optical filter may further comprise a light attenuating layer.

A user may control the light transmissibility of an optical filter by controlling the voltage applied to the composite optical filter, the light it is exposed to, or both. Voltage may be applied continuously, or intermittently to switch the optical filter from a dark to a faded state, or to maintain the optical filter in a faded state.

Figure 1:
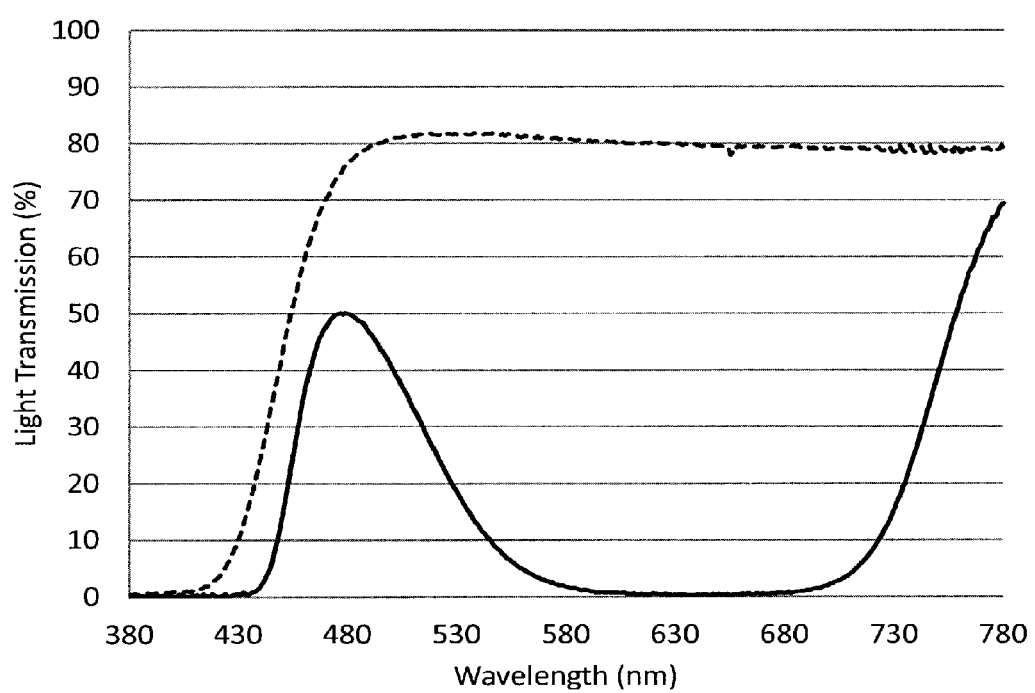
FIG. 1 shows light transmission profiles of S109 in dark (solid line) and faded (dashed line) states, according to one embodiment.
Figure 2:
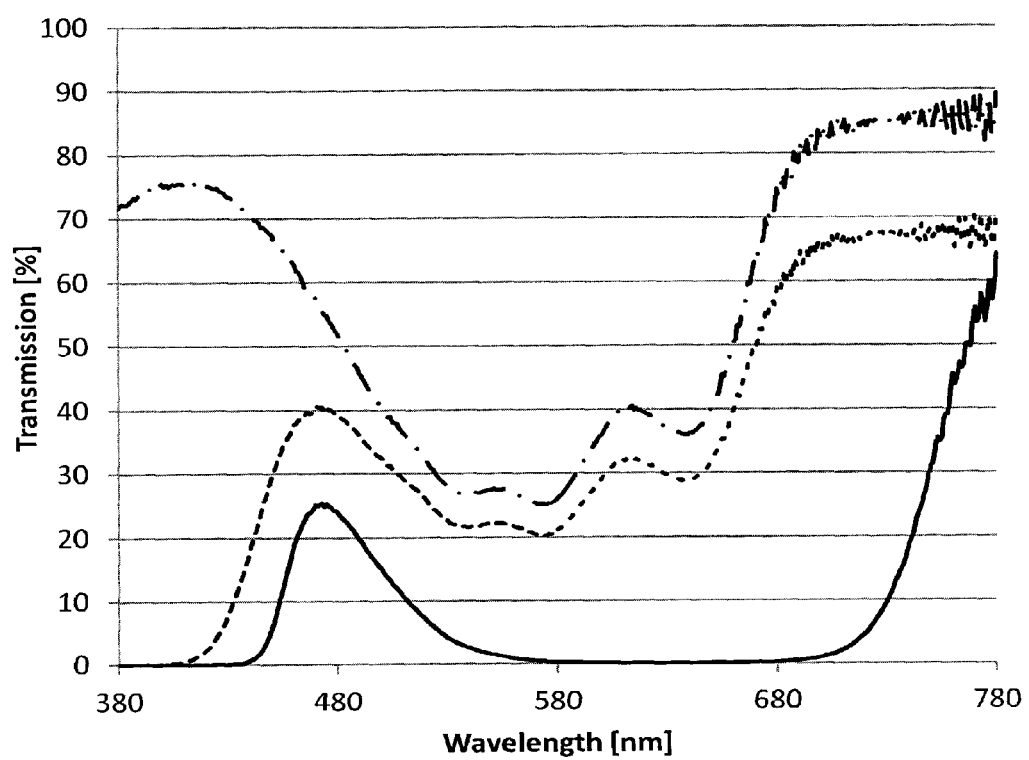
FIG. 2 shows light transmission of an interlayer comprising S109 with a color balancing layer. Dark state—solid line; faded state—dotted line; color balancing layer—alternating dot/dash line, according to another embodiment.

A spectrum refers to a characteristic light transmission of an optical filter or component of a optical filter. The transmitted light may have a UV, a visible and/or an IR component or portion. As examples, FIG. 1 illustrates a visible portion of the spectra in the dark and faded state of a variable transmittance layer comprising S109 switching material. FIG. 2 illustrates a visible portion of the spectra of an optical filter comprising the variable transmittance layer of FIG. 1 and a color balancing layer. The spectrum of the color balancing layer is also shown. Spectra from layers may be combined by addition, multiplication or subtraction of the transmitted wavelength values, and the visible region of the resulting spectrum may be described with reference to color (e.g. with L*a*b* values, $LT_A$, delta ($\Delta$) C, delta E or the like).

A variable transmittance layer may comprise a variable transmittance optical filter. A variable transmittance optical filter may be based on photochromic/electrochromic materials which darken when exposed to electromagnetic radiation ("light") and fade when a voltage is applied to the material. Some photochromic/electrochromic materials may also fade when light of a selected wavelength is incident on the switching material. The light transmitted by a variable transmittance optical filter in a dark or a light state may be altered by one or more color balancing and/or light attenuating layers. In some embodiments, the optical filter may be a film (a multi-layer film). In some embodiments, the optical filter may comprise a rigid component, such as a layer of glass. The optical filter may be laminated to, or between, between layers of glass using one or more adhesive layers. In some embodiments, the layers of a optical filter (e.g. variable transmittance layer, color balancing layer, light attenuation layers, adhesive layers or the like) between two layers of glass may collectively be referred to as an "interlayer".

The term 'stack' may be used generally to describe an arrangement of two or more layers (glass, interlayer, color balancing layer, light attenuation layer, adhesive layers or the like), one on top of the other, through which light is transmitted. The stack may be described with reference to color, spectrum, transmitted light or a difference between the color or transmitted light of a stack, relative to a target ($LT_A$, L*a*b*, delta C, delta E or the like).

Generally, a window comprising a variable transmittance component (e.g. a variable transmittance optical filter, variable transmittance laminated glass or the like) may separate an interior space from an exterior space. It may be desirable to alter the observed color of the window, or the color of the transmitted light, to match or approximate a target color that is different from the color of the variable transmittance layer. For example, it may be desirable to match or approximate a target color to harmonize the appearance of the window with a building envelope or the exterior color of a vehicle, or to harmonize the appearance of the window with other components of the window such as the frame. FIGS. 3-8B illustrate examples of various configurations and arrangement of the layers in an optical filter that may be used for such windows. In some embodiments, the relative position of the layers may be described with reference to the variable transmittance layer, the incident light, or a space defined in part by the window. For example, in reference to FIG. 3, a color balancing layer 14 is inboard of a variable transmittance layer 16—layer 14 would be closer to the interior space if this were part of a window installed in a building or vehicle. Similarly, a layer 12 is outboard of the variable transmittance layer 16. Incident light from a light source may be natural or simulated sunlight, or may be artificial light from any source. The incident light may comprise some or all of the full visible spectra, and largely exclude light outside the visible spectra, or the incident light may comprise a UV and/or infrared/near infrared component.

Color and Light Transmission of Layers:

The color of a switching material, layer, an optical filter or a laminated glass comprising an optical filter may be described with reference to colour values L*a* and b* (in accordance with Illuminant D65, with a 10 degree observer),\ and/or with reference to the visible light transmission $LT_A$ (luminous transmission, Illuminant A, 2 degree observer). $LT_A$ and L*a*b* values may be measured in accordance with SAEJ1796 standard. The L*a*b color space provides a means for description of observed color. L* defines the luminosity where 0 is black and 100 is white, a* defines the level of green or red (where +a* values are red and −a* values are green), and b* defines the level of blue or yellow (where +b* values are yellow and −b* values are blue). An increase in b* value indicates an increase in the yellowness of the material, while a decrease in b* indicates a decrease in the yellowness of the material. An increase in a* value indicates an increase in the redness of the material, while a decrease in a* value indicates a decrease in the redness of the material. For reference to neutral greys, the transmitted color may be describe relative to L*, by calculating C (or C*ab) value, where C=$(a^2+b^2)^{1/2}$. For example, a transmitted light described as having an L* of about 40 to about 60, an a* of about −10 to about +10 and a b* of about −10 to about +10 (describing an area about the centre of CIELAB coordinate system) may be perceived as 'neutral', or not substantially red/green or blue/yellow.).

A spectrophotometer may provide information concerning a materials light transmittance or absorbance at a selected wavelength or over a range of wavelengths. Absorbance and transmission of light are related through the Beer-Lambert law. Transmission spectra may be converted to an absorption profile (spectra) according using equation (1):

$$A = -\log_{10}\left(\frac{I}{I_0}\right) \quad (1)$$

Absorbance values may be converted to transmission in a similar manner.

Generally, intensity of color increases with the amount of chromophore in a switching material, and $LT_A$ in a dark state decreases. Where a darker optical filter is desired, this trend may be beneficial, however reduction of the amount of chromophore may be also desirable from a cost perspective.

To describe a scalar relationship between a target color and the color of an optical filter, ΔC (delta C) may be calculated:

$$\text{delta}C = C^*_{ab} \text{ of optical filter} - C^*_{ab} \text{ of target.}$$

To describe a vector relationship between a target color and the color of an optical filter, ΔE (deltaE) is calculated:

$$\text{delta}E^*_{ab} = [(\text{delta } L^*)^2 + (\text{delta } a^*)^2 + (\text{delta } b^*)^2]^{1/2}$$

Figure 9:
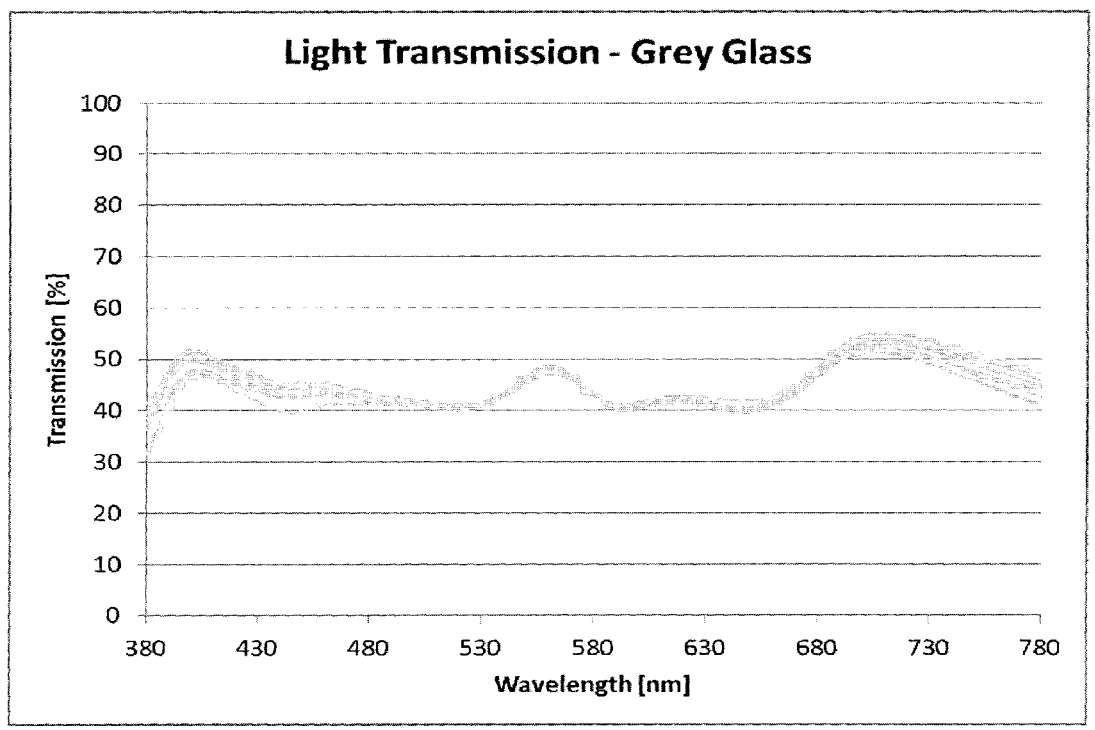
FIG. 9 shows the transmission spectra from 10 commercial sources of 'grey' glass, demonstrating a maximum C value (Cmax) of 4.4, with an average C value (Cavg) of 1.6, according to an embodiment.

As an example to illustrate the range of C values that may be useful for automotive sunroofs according to some embodiments, transmission spectra from 10 commercial sources of 'grey' glass were obtained (normalized for $LT_A$), demonstrating a maximum C value (Cmax) of 4.4, with an average C value (Cavg) of 1.6, but with substantially similar reduction of $LT_A$ across the entire visible spectrum (FIG. 9). Other L*a*b* values over a range of grey tones are addressed below. Thus, a neutral color may be described as achromatic (having a similar, or approximately similar $LT_A$ over the visible range). When judged "by eye", a neutral color is not substantially yellow/blue or red/green. The lower the deltaC or deltaE value, the lesser the difference in color between the target color and the color of the stack. Generally, a stack approximating a target color will have a delta C of about zero to about 20, or any amount therebetween, or a deltaE of about zero, or any amount therebetween. A range of about zero to about 20 or any amount therebetween includes, about 1, 2, 3, 4, 5, 6, 7, 8, 9, 10, 11, 12, 13, 14, 15, 16, 17, 18 or 19, or any amount therebetween.

Generally, there are no limitations to the color of an optical filter in a faded or dark state—generally the faded state will be substantially colorless, or faintly colored and substantially colored in a dark state. Generally, intensity of color may increase with the amount of compound in the switching material. Where a neutral color of the optical filter is desired, one or more additional layers may be included to alter the transmitted light. Some layers may reduce the overall light transmission—as illustrated in FIG. 9, grey glass reduces the transmitted light a similar amount across the 380-780 nm range—whereas some layers selectively transmit light for only a portion of the visible range. A layer may comprise a static (non-switching) color filter. Further, even though two filters may appear alike to the eye or under some lighting conditions, they may demonstrate spectra that differ significantly in some wavelengths thus it may not be readily apparent which filters may be suitable. Further, some filters may block or transmit portions of light (UV, VIS and/or IR) to combine with light transmitted by a variable transmittance optical filter. What spectra of a color balancing layer may be suitable may be dependent on the spectra of the variable transmittance layer.

According to some embodiments, an optical filter, may have an $LT_A$ of less than about 1%, or less than about 2% or less than about 5% or less than about 10% in a dark state. According to some embodiments an optical filter may have an $LT_A$ of greater than about 5% or greater than about 10% or greater than about 15% or greater than about 20% in the faded state.

According to some embodiments, an optical filter may have an $LT_A$ of from about 1% to about 10%, or any amount or range therebetween in the dark state, and an $LT_A$ of from about 5% to about 30% in the faded state, or any amounts or ranges therebetween. For example, the optical filter may have an $LT_A$ in a dark or faded state of about 1, 2, 3, 4, 5, 6, 7, 8, 9, 10, 12, 14, 16, 18, 20, 25 or 30%, or any amount or range therebetween, with the proviso that the dark state has a lesser $LT_A$ than the faded state.

Where the target is a neutral colored 'stack', an optical filter according to various embodiments may have, in a faded state, an L* value of about 40 to about 60 or any amount therebetween; an a* value of about −10 to about 5 or any amount therebetween; and a b* value of about −1 to about 5 or any amount therebetween.

A layer outboard or inboard of the variable transmittance layer will alter the amount and color of the transmitted light; a layer placed inboard of a variable transmittance layer may be referred to as a color balancing layer, whereas a layer placed outboard of the variable transmittance layer (a light attenuating layer) will alter the composition of the light incident on the variable transmittance layer, in addition to affecting the amount and color of transmitted light. A color balancing layer comprises a spectrum that combines with the spectrum of the other layers in the stack to provide a color that approximates a target color. In some embodiments, the color balancing layer may be of a color complementary to that of the variable transmittance layer in a dark state, faded state, or both a dark and a faded state. In some embodiments, the color balancing layer complement may the other layers of the stack, to create approximately equal transmission in the stack spectrum, particularly in the ~410-500 nm and ~530-645 nm ranges.

The light attenuating layer may influence, for example, photostability, photostationary state (PSS) or switching kinetics, and/or the overall $LT_A$ of the stack. A balance is sought between sufficient high energy light to effect the photochromic darkening reaction, reducing the incidence of higher energy wavelengths to improve lifetime of materials, and achieving a suitable $LT_A$ of the stack. In some embodiments, the light attenuating layer comprises a spectrum that combines with the spectra of the other layers in the stack to provide a color that approximates a target color. In some embodiments, the light attenuation layer may be a neutral grey (e.g. grey glass), or may be a grey static filter, or may be a colored static filter selected to attenuate a portion of the incident light for manipulation of the composition of the light reaching the variable transmittance layer. This selective attenuation of incident light may alter the fading ability or fading speed of the switching material of the variable transmittance layer. In some embodiments the light attenuation layer may selectively block a portion of incident light in the UV, or higher energy visible range.

The color of the color balancing layer and/or the light attenuation layer may provide a color complementary to that of the variable transmittance optical filter in a dark state, a faded state or a dark state and a faded state. The light attenuation layer may be outboard of the variable transmittance optical filter, and the color balancing layer is inboard of the variable transmittance optical filter—the color of the transmitted light is manipulated by the interaction of all three layers, whereas the light reaching the variable transmittance is manipulated by the light attenuation layer. Additional layers may be included in the optical filter.

Two or more spectra may be described as 'complementary' when they provide an achromatic, or apparently achromatic spectra ("neutral color") when the visible portions of the spectra are combined.

Photostability of switching material, or components thereof, may be improved if higher energy wavelengths of light are attenuated. Some UV blocking materials may reduce or eliminate light below about 380 nm, however a balance may need to be achieved between restriction of the light of about 420 nm or less (to improve photostability of the switching material) and transmission of sufficient light in this range to effect a photochromic switch to a dark state, for a material having a photochromic aspect. Maximum transmission of light above this range may allow maximizing of $LT_A$ of the stack. Photostability of the switching material may also be improved by reducing overall the amount of visible light reaching the switching material—a filter that reduces some of the incident light up to about 650 nm, may improve photostability, while preserving sufficient higher energy wavelengths to effect the photochromic switch, and maximizing the $LT_A$. For example, attenuation of light in a portion centered about 650 nm may reduce the amount of light absorbed by the chromophore, that would effect a photochromic transition to a faded state (photofading). By attenuating light in this region of the spectrum, the photostationary state of the chromophore may be improved (a darker dark state). Conversely, attenuation of light in this region may also aberrantly affect fading of switching material by reducing any photofading effect, and making the fading reaction more reliant on electrofading alone. Attenuation of the entire spectrum of visible light (by including in a light attenuating layer a grey filter or grey glass, for example) may be advantageous by offering protection from the higher energy wavelengths of light, reduce a photofading response, and/or reducing overall $LT_A$ of the stack. In some embodiments, a light attenuating layer may block from about 10% to about 90% of light incident on the optical filter.

The fading kinetics of the optical filter may also be altered by inclusion of a light attenuating layer—by reducing or blocking the wavelengths of light incident on the switching material that photochromically fades the switching material, a darker (greater absorption) photostationary state may be achieved. The fade time of the switching material may also be increased. By reducing or blocking the wavelengths of light incident on the switching material that photochromically darken the switching material, a lighter (reduced absorption) faded state may be achieved; the darkening time of the switching material may also be increased.

In some applications, it may be advantageous to have a longer darkening time. When electrofading an optical filter in the presence of sunlight there is a competition between the rate of darkening induced by sunlight and the rate of electrofading. In order to achieve the fully faded state in the presence of sunlight, the rate of darkening must be substantially slower than the rate of electrofading. A cutoff filter may be selected with a cutoff wavelength that combines photostability, extent of darkening and darkening time properties. Selection of a cutoff wavelength may vary with the chromophore of the switching material, because the ring-open absorption spectrum and wavelength-dependence of efficiency of ring-closing varies depending on chromophore structure. Where the cutoff filter blocks some or all of the incident UV light, and/or a portion of the higher energy visible light, the phostationary state of the switching material may be altered—in some embodiments, the photostationary state of the switching material may result in a lower $LT_A$ for the dark state than if the UV and/or higher energy visible light were not blocked.

Therefore, in some embodiments, control of the photostationary state by inclusion of a cutoff filter in the optical filter may be used to control the appearance or color of the variable transmittance layer, and thus of the entire optical filter. By altering the amount of light below about 450 nm, or in the 540-600 nm range that is incident on the variable transmittance layer, the equilibrium of ring open to ring closed configurations of the chromophores may be shifted to increase or decrease the proportion of molecules in the dark state, or ring-closed configuration.

Figure 3:
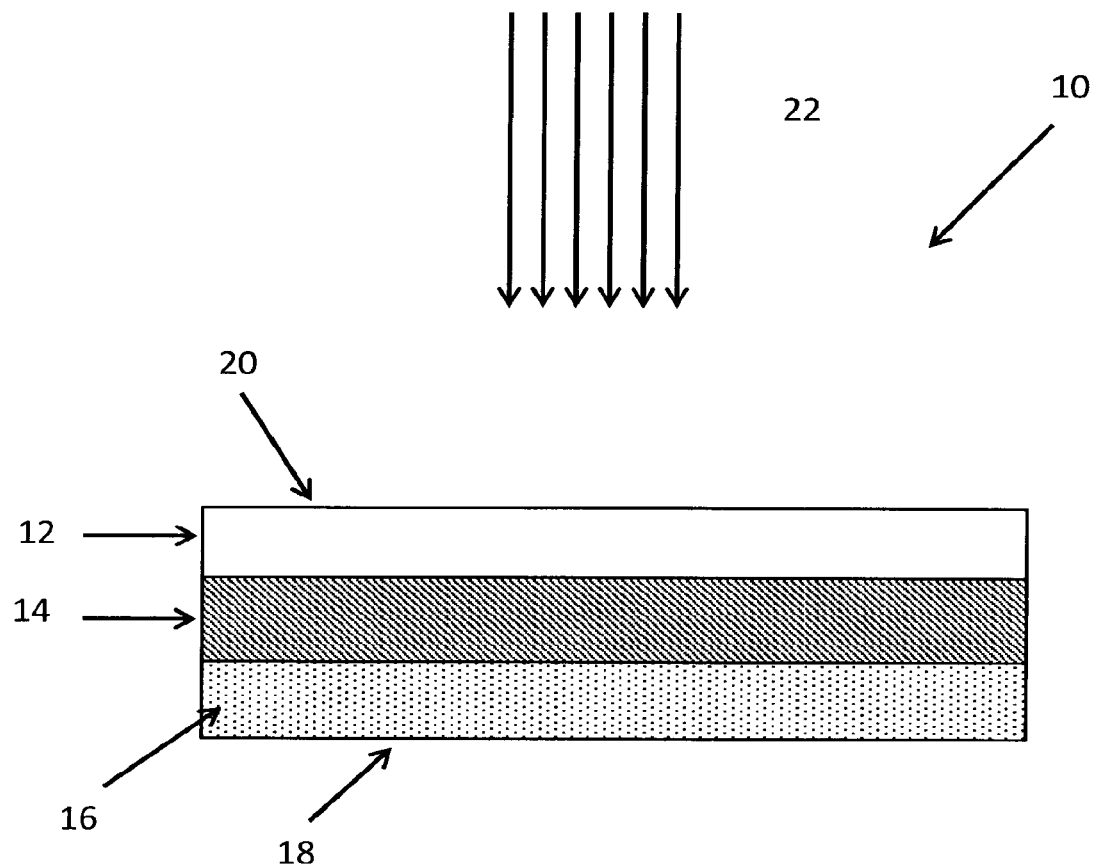
FIG. 3 shows a sectional view of an apparatus according to another embodiment.
Figure 7A:
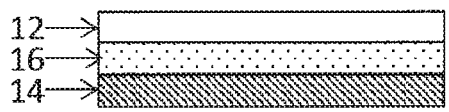
FIGS. 7A-7I show sectional views of various apparatus configurations according to other embodiments.
Figure 7B:
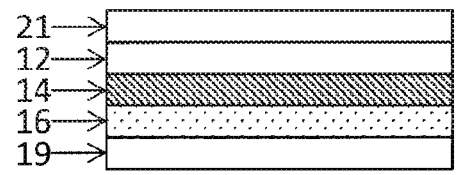
Figure 7C:
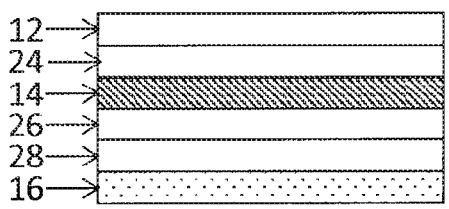
Figure 7D:
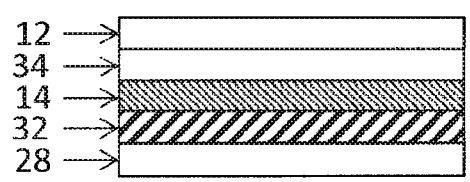
Figure 7E:
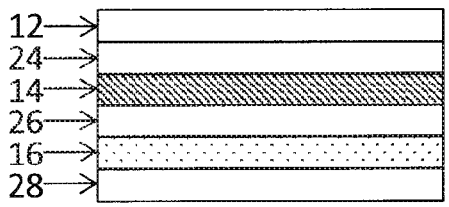
Figure 7F:
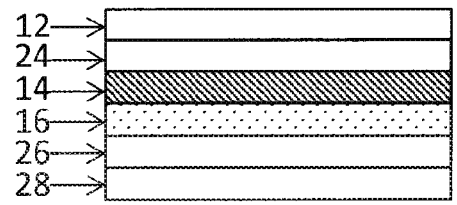

Referring to FIG. 3, an embodiment is shown generally at 10. A variable transmittance layer 14 may be disposed between a layer 12 and a color balancing layer 16. Layer 12 may be glass, and may be colored or colorless. Layer 12 may function as, and may be referred to as, a first light attenuating layer. Surface 18 may additionally have a security film layer disposed thereon to reduce scratching of surface 18 and/or to increase the strength and toughness of the stack. Surface 20 may have one or more additional layers disposed thereon, such as an anti-scratch layer, an IR blocking layer, a self-cleaning layer or the like (FIG. 7B). An adhesive layer may be used to attach the variable transmittance layer 14 or color balancing layer 16 to the layer 12 and/or the color balancing layer 16 to the variable transmittance layer 14. Examples of an adhesive layer include a pressure sensitive adhesive (PSA) or an adhesive resin such as PVB, EVA, polyurethane, polyvinyl chloride, ionomer resin or the like. FIG. 7A illustrates an alternate embodiment with a colored layer outboard to the VTOF layer 14—in this embodiment, the colored layer be a light attenuating layer.

Figure 4:
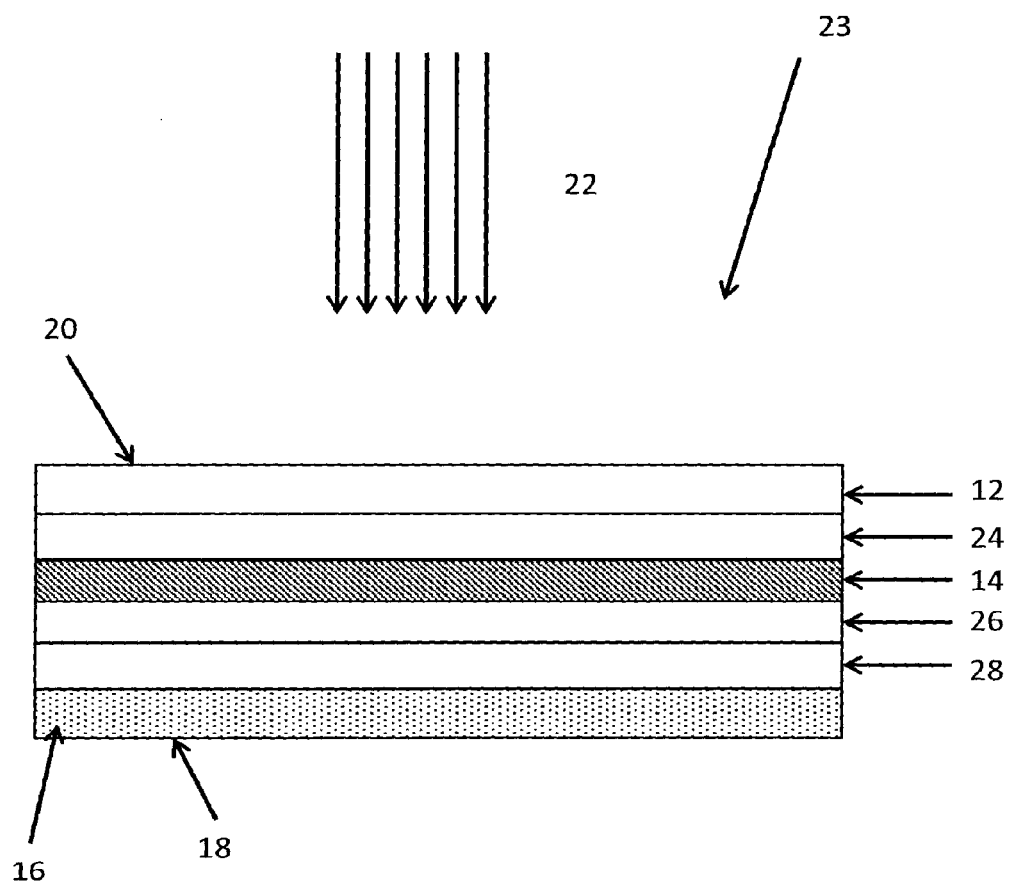
FIG. 4 shows a sectional view of an apparatus according to another embodiment.

Referring to FIG. 4, another embodiment is shown generally at 23. The variable transmittance layer 14 may be attached to the layer 12 with a first adhesive layer 24, and to a second layer 28 by a second adhesive layer 26. Second layer 28 may be a glass layer. In the embodiment shown, the color balancing layer 16 is attached to a side of the second layer of glass 28 opposite the second adhesive layer 26. In an alternate configuration, the color balancing layer may be attached to a side of the second layer by, within, or adjacent to, the second adhesive layer 26.

Figure 5:
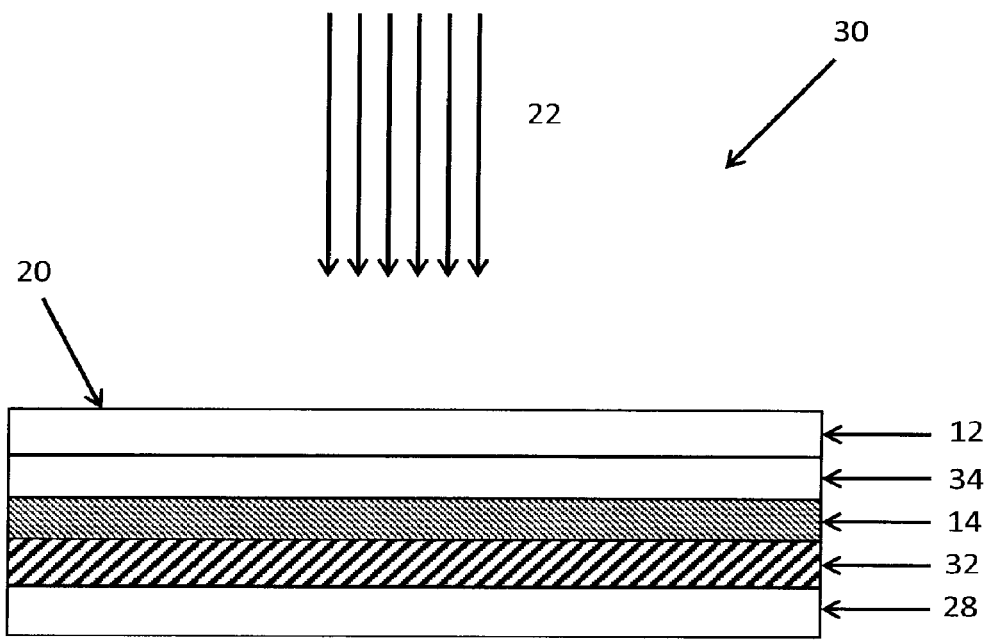
FIG. 5 shows a sectional view of an apparatus according to another embodiment.

FIG. 5 provides another embodiment of a laminated glass, illustrated generally at 30. The variable transmittance layer 14 may be attached to the layer 12 with an adhesive layer 34, and to the second layer 28 with a second adhesive layer 32. Adhesive layers 32, 34 may be colored, or comprise a colored layer—for example, adhesive layer 32 may comprise a color balancing layer, and/or adhesive layer 34 may comprise an light attenuating layer (incident light filter). Selection of the color/composition of layer 34 may be dependent on the particular photochromic, or photochromic/electrochromic compound in layer 14, the color of layer 12 and/or 28, and/or on the composition of the incident light 22. Layers 32, 34 may be of any suitable thickness from about 0.1 mm to about 1 mm, or any amount therebetween, for example 0.38 or 0.76 mm.

Figure 6:
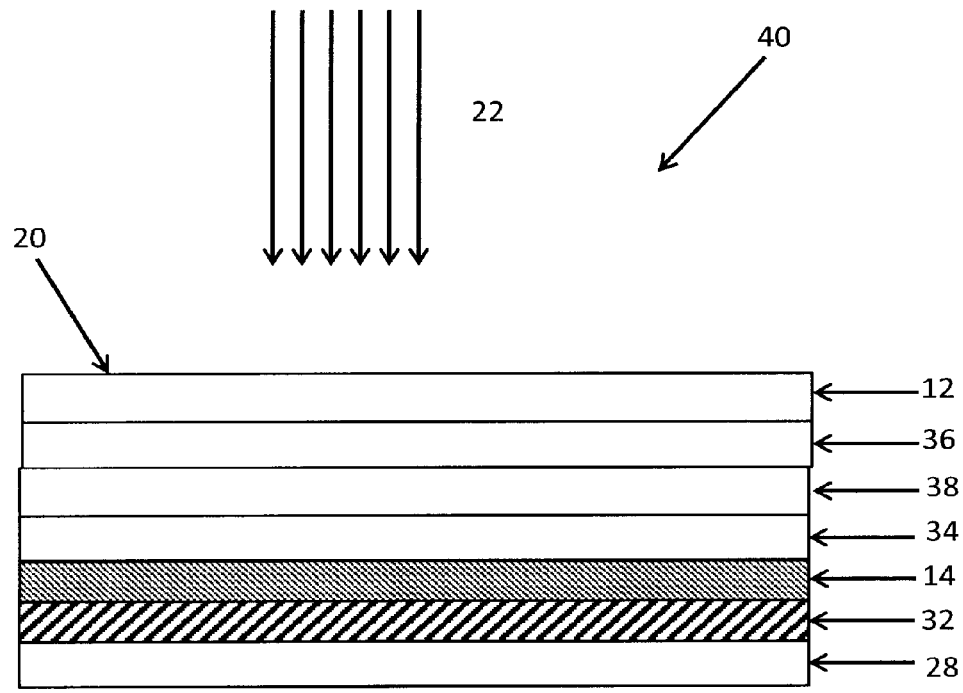
FIG. 6 shows a sectional view of an apparatus according to another embodiment.
Figure 7G:
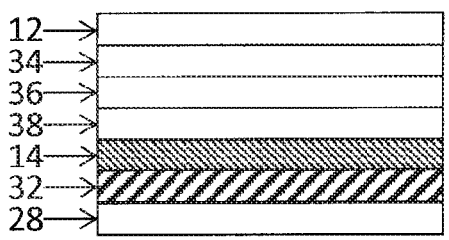
Figure 7H:
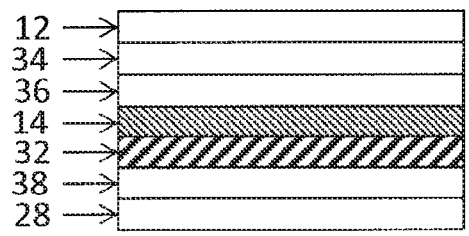
Figure 7I:
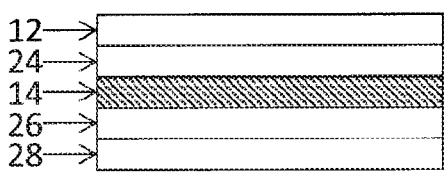

Another embodiment of the laminated glass of FIG. 5 further comprising a sound insulating layer 36, and an infra-red (IR) blocking layer 38 is shown generally at 40 of FIG. 6. The illustrated configuration places layer 36 outboard of layer 38, however an alternate arrangement placing layer 38 outboard of layer 36 is also contemplated (FIG. 7G). FIG. 7H illustrates another layering configuration, placing layer 38 inboard of layer 36 and the variable transmittance layer. A configuration placing an IR blocking layer 38 that absorbs IR light inboard of the variable transmittance layer may be an advantageous configuration where it is desirable to warm up the variable transmittance layer (e.g. when using the optical filter or laminated glass in a cold environment, operation of vehicles in cold climates or the like). FIG. 7I shows another embodiment where layer 12 may be a light attenuating layer and the spectra of the light attenuating layer may combine with the spectra of the variable transmittance layer to approximate a target color. Alternately, a color balancing layer aspect of a stack may be realized by an adhesive layer or a layer of the variable transmittance layer (e.g. a tinted adhesive layer, or tinted substrate).

In another embodiment, an optical filter comprising a variable transmittance layer may comprise connectors for connection to a control circuit. FIGS. 8A and 8B exemplify the layered compositions of FIGS. 7I and 7F, respectively, illustrating an optical filter comprising the variable transmittance layer 14 connected to a control circuit; however it will be appreciated that any of the layered compositions comprising a variable transmittance layer with an electrochromic aspect may be connected to this or a similar control circuit. Adhesive layers 24 and 26 laminate the variable transmittance layer 14, or the variable transmittance layer 14 and color balancing layer 16, between first 12 and second 28 layers. The first 42 and second 44 electrical leads connect the variable transmittance layer to a control circuit comprising a power source (voltage source) 46. A switch 48 may open and close the control circuit to control power to the switchable optical filter based on input. Switch 48 may be a two-way or three-way switch, or may be a multi-state control device such as a potentiostat, and allow selection of different states of the variable transmittance layer. Input may come from a user (e.g. operation of a switch), or some other input such as a timer, pre-existing instructions (e.g. programmed into a memory comprising part of the control circuit) a device monitoring the light transmittance of the switchable optical filter, incident light, and may be operable by a user, a pre-existing program, timer or another component of the control circuit.

Other components of a control circuit may include a DC-DC converter for converting the voltage from the power source to an appropriate voltage, a voltage regulator, timer, light sensor, voltage or resistance sensors or the like. Control circuits and systems that may be used with variable transmittance optical filters and layered compositions according to various embodiment are described in, for example, PCT publication WO2010/142019, and U.S. Provisional patent application 61/625,855 filed Apr. 18, 2012 (now International Application No. PCT/CA2013/000381).

Electrical leads 42, 44 and the variable transmittance layer 14 may together provide a physical separation between adhesive layers 24, 26. Alternately, electrical leads 42, 44 extend out one side of the laminated glass (such as in FIG. 9), and layers 24, 26 are bonded around the periphery of the variable transmittance layer, encapsulating the variable transmittance layer 14, busbars 58 a, b and a portion of the electrical leads 42, 44 contacting busbars 58 a, b, forming a sealed optical filter.

FIGS. 10A and 10B show top and sectional views, respectively, of a schematic diagram of a variable transmittance layer, illustrating busbars and electrical leads connected thereto. A variable transmittance optical filter comprising a layer of switching material 52 between first 54 and second 56 substrates is electrically connected to electrical leads 42, 44 via busbars 58a, b applied to a conductive coating 60a, 60b on substrates 54, 56, in contact with the switching material 52. The substrates of the switchable optical filter have opposing overhanging edges, cut to expose the conductive coating. Peripheral seal 64 seals the cut edge of the switching material. The cut variable transmittance optical filter may be attached to first 66 and second 68 transparent layers with adhesive layers 70 (before or after application of the first seal material). Additional seal material 78 is applied in a space defined in part by the first and second transparent layers 66, 68 and the seal material 64. This additional seal material may be a separate application of the same substance as the first seal material, or may be a different seal material.

Glass:

Where layers 12 and/or 28 are glass, they may independently be from about 1 mm to about 6 mm thick, or any amount therebetween—for example 1.5, 2, 2.5, 3 mm or the like. Glass layers may independently be coated with, or comprise heat or infrared reflecting or absorbing materials, or UV reflecting or absorbing materials. Glass layers may independently be mineral glass (e.g. float glass, tempered glass or an organic glass; an organic glass is an amorphous, solid glasslike material made of transparent plastic. Organic glass may provide advantages such as toughness, reduced weight, improved thermal insulation, ease of colour modification (incorporation of colorants in the plastic when molding) or the like. Examples of organic glass include polycarbonate (e.g. LEXAN™), acrylonitrile butadiene styrene (ABS), polyesters (PET, PETG), acrylics (polymethyl methacrylate) (e.g. PLEXIGLAS™, LUCITE™) or modified acrylics (imidized, rubber toughened, stretched or the like), polyester carbonate, allyl diglycol carbonate, polyether imide, polyether sulfone (polysulfone, PSU), cellulose acetate, cellulose butyrate, cellulose propionate, polymethyl pentene, polyolefins, nylon, polyphenylsulfone, polyarylate, polystyrene, polycarbonate, polysulfone, polyurethane, polyvinyl chloride, styrene acrylonitrile (SAN), EVA, or the like.

Glass layers may independently be tinted. Examples of tinted glass include 'grey', 'bronze' or 'green' glass, and may be selected to achieve certain levels of light transmission (visible, UV or IR), or to harmonize with the site of installation e.g. exterior automotive paint, building envelope, or to harmonize with other components of a laminated glass. Glass color may be described with reference to colour values L*a* and b*, and/or $LT_A$. Grey glass may have an $LT_A$ of about 9 to about 63%, or any amount therebetween; an L* value of about 36 to about 84 or any amount therebetween; an a* value of about −2.5 to about 1.6 or any amount therebetween; and a b* value of about −1.8 to about 3.6 or any amount therebetween. Green glass may have an $LT_A$ of about 52 to about 91% or any amount therebetween. Green glass may have L* value of about 78 to 97 or any amount therebetween; an a* value of about −11 to 0 or any amount therebetween; and a b* value of about −0.5 to about 1.5 or any amount therebetween. As examples, U.S. Pat. No. 5,308,805 describes a neutral low transmittance glass and U.S. Pat. No. 7,932,198 describes examples of grey glass.

In some embodiments, the first glass layer 12 may be clear, or may be grey, with an $LT_A$ of about 25-35% or any amount or range therebetween. The second layer of glass 28 may be clear, or may be colored (e.g. grey), with an $LT_A$ of about 75-85% or any amount or range therebetween. The layer 12 may be coloured to harmonize with the exterior paint of the vehicle or building where the laminated glass is installed, or to mask the inherent color of one or more layers in the laminated glass (e.g. the variable transmittance layer, the static filter or the incident light filter, for embodiments where one or more of these layers has a colour that does not harmonize with the surrounding surface or paint). Alternately, the layer 12 may be substantially clear to allow as much light as possible reach the variable transmittance layer.

Where the glass is an organic glass, it may be advantageous to include a layer of plastic (e.g. PET film) between the organic glass and an adhesive layer or sound insulating layer comprising PVB, to prevent diffusion of plasticizers or other components of the adhesive layer into the organic glass.

Variable Transmittance Layer:

A variable transmittance layer comprises a variable transmittance optical filter, itself comprising a switching material (switchable material). A variable transmittance optical filter comprises a first, and optionally a second, substantially transparent substrate, a first and a second electrode disposed on the surface of at least one of the substrates and a switching material disposed between the first and second substrates, and in contact with the first and second electrodes. Examples of variable transmittance optical filters are described in WO2010/142019 and in provisional patent applications 61/589,153 and 61/602,203 (now International Patent Application Nos PCT/CA2013/000054 and PCT/CA2013/000176). Additional examples of switching material are described in International patent application No. PCT/CA2012/000910. The first, second or first and second substrates may be colorless or may be colored; in some embodiments, the color may be selected to be complementary to that of the switching material in a dark state, faded state or dark state and faded state, and/or complementary to the color of one or more layers in the optical filter or laminated glass Switching Material:

Switching material disposed upon a substrate, with or without a second substrate, may be generally referred to an optical filter. In some embodiments, the switching material may be disposed upon a first substrate, or "sandwiched" between a first substrate and a second substrate, the switching material capable of transitioning between a light state and a dark state based on application of light in the UV and/or VIS range, and application of an electric voltage. The switching material may be a liquid, a gel, a solid or a semi-solid, and may be formed in a layer with a thickness of about 0.1 micron (micrometer, μm) to about 100 microns, or any amount or range therebetween, for example from about 10 microns to about 50 microns, or from about 0.1 micron to about 10 microns, or from about 0.5 micron to about 5 microns, or from about 0.5 micron to about 2.5 micron or any amount or range therebetween. In some embodiments, the layer of switching material is of uniform, or substantially uniform, thickness. In some embodiments, the layer of switching material is of non-uniform thickness.

A switchable film, or optical filter or device comprising a switchable film, may have a switching time from a dark state to a faded state of from about 10 seconds to about 5 minutes, or any amount or range therebetween. Switching time may be altered by varying one or more of thickness of material (e.g. a layer or cast sheet of switching material), solvent proportion, chromophore proportion, degree of crosslinking of the thermoset polymer, proportion of thermoset polymer, composition of thermoset polymer, hardness of the cross-linked switching material, or the like.

A switching material may have both electrochromic and photochromic properties. A switching material may darken when exposed to ultraviolet (UV) light or blue light from a light source, and may fade when exposed to a voltage, or when exposed to light that excludes wavelengths below about 475 nm. Such a switching material may be alternately described as an auto-darkening material. In some embodiments, the switching material may fade upon exposure to selected wavelengths of visible (VIS) light, without sacrifice of the ability to be electrofaded when restored to a darkened state. In some embodiments, the switching material may darken when exposed to light comprising wavelengths from about 350 nm to about 450 nm, or any amount or range therebetween, and may fade when a voltage is applied. The switching material may be optically clear, or demonstrate no more than 1%, no more than 2% or no more than 3% haze in both faded and dark states.

Switching material, optical filters or laminated glass according to various embodiments may be described with reference to one or more properties, for example, photostationary state (PSS), photostability, visible light transmission (VLT), luminous transmittance ($LT_A$) contrast ratio, colour, solubility, electrochemical durability, thermal stability, switching voltage, switching time, manufacturability, switching kinetics, haze, operating temperature, manufacturing conditions or processes or the like.

Switching material that may be used with optical filters is described in International patent application No. PCT/CA2013/000339 filed Apr. 9, 2013, claiming priority to U.S. 61/621,736, filed Apr. 9, 2012, U.S. 61/673,470, filed Jul. 19, 2012 and U.S. 61/706,001 filed Sep. 26, 2012.

A switching material may comprise (by weight percent) about 3 to about 20 parts polymer or polymer matrix (e.g. a thermoset polymer), about 60 to about 85 parts solvent, about 0.1 to about 10 parts ionic material (salt or the like), about 0.1 to about 30 parts of a compound having electrochromic and photochromic properties. The polymer matrix may be formed from crosslinking of a crosslinkable polymer. Generally (without wishing to be bound by theory), a switching material comprising a greater proportion of chromophore, solvent and/or ionic material may have a faster switching time than a switching material with a lesser proportion of chromophore, solvent and/or ionic material. A thinner switchable material may have a faster switching time than a thicker one. A switching material with a higher degree of cross-linking may have a slower switching time than one with a lesser degree of cross-linking. A switching material with a greater proportion of thermoset polymer, rheology modifier, or thermoset polymer and rheology modifier may have a slower switching time than one with a lesser proportion of thermoset polymer, rheology modifier, or thermoset polymer and rheology modifier. A switching material may be applied to a substrate using extrusion or roll-to-roll coating, and a second substrate attached thereto, to provide a variable transmittance filter.

An electrolyte is a conductive component of a switching material. The conductive component may be a conductive liquid or other flowable material, or may comprise one or more solvents and one or more ionic materials (salt or the like). The electrolyte, or a solvent component thereof, may have one or more of the following characteristics: a boiling point of about 150° C. or greater, a vapour pressure of about 0.001 mmHg or less at 20° C., a Yellowness Index (YI) of about 6 or less; a flash point of about 80° C. or greater, a melting point of about 40° C. or less. The solvent may be a plasticizer, or act as a plasticizer. A suitable solvent is compatible with components of a switching material, and does not inhibit darkening or fading of the switchable material; a suitable solvent may also demonstrate a suitable cyclic voltammetry profile (consistent reduction and oxidation peaks for two or more scan cycles), and/or suitable photostability (darkening performance of 90-100% of baseline for at least 250 hours of weathering, exposed to a light source providing 0.68 W/m² of UV light at a wavelength of 340 nm—or about 0.6 MJ/m² cumulative exposure). Examples of solvents include triglyme, tetraglyme, ethylene carbonate, butyrolactone, cyclopentanone, ethylene glycol phenyl ether; diethylene glycol monobutyl ether; diethyl succinate; triethylene glycol di-2-ethyl butyrate (TEG DEB); tetramethylene sulfone (sulfolane); bis(2-ethylhexyl) adipate; Bis[2-(2-butoxyethoxy)ethyl] adipate (BEEA); triethylene glycol bis(2-ethylhexanoate) (TEG BEH); propylene carbonate (PC); 2,2,4-trimethyl-1,3-pentanediol monoisobutyrate ("Texanol"); diethyl azelate; dimethyl adipate (DMAd), diethyl adipate (DEAd), dibutyl itaconate (BI), 1,2-butylene carbonate, dibasic esters such as dimethyl 2-methylglutarate (Rhodiasolv IRIS™) or the like. In some embodiments, the solvent is optically clear, or substantially optically clear, and the one or more ionic materials, rheology modifiers, gelling agents, polymers, co-solvents, accelerants, hardeners, cross linking agents and other components of a switching material or composition are soluble in the solvent.

One or more solvents may be present in a switching material or composition in an amount from about 30% to about 95% (by weight), or any amount or range therebetween, for example 30, 40, 50, 60, 70, 80 or 90%, or any amount or range therebetween. In some embodiments, the solvent, or one or more components of the solvent (e.g. where the solvent is a mixture of two or more isomers or two or more compounds) may participate in a crosslinking reaction in the formulation. Such a solvent may be alternately referred to as a 'reactive diluent' or 'reactive solvent'.

An electrolyte may comprise a salt. Examples of salts include alkali metal salts, tetralkyl-, tetramethyl-, tetraethyl- or tetrabutylammonium salts, tetrabutylphosphonium salts, tetraphenylphosphonium salts, tributylmethylphosphonium salts or the like. Examples of salts include tetrabutylammonium tetrafluoroborate (TBABF$_4$), tetrabutylammonium hexafluorophosphate (TBAPF$_6$) tetrabutylammonium bis(trifluoromethanesulfonyl)imide (TBA-TFSI) or the like. The one or more salts may be present in an amount from about 0.1% to about 10% (by weight) or any amount or range therebetween, for example 1, 2, 3, 4, 5, 6, 7, 8, or 9%.

The polymer or polymer matrix may be a polyalcohol—examples include ethylene vinyl alcohol copolymer, polyvinyl alcohol (PVOH, PVAl), polyvinyl acetals (e.g. polyvinyl butyral, PVB), poly(ethylene oxide) (PEO), partially hydrolyzed EVA or the like. The resin may comprise a linear, branched, or dendrimeric polymer. Generally, a polyol resin combined with a crosslinking agent under suitable reaction conditions may crosslink two alcohol groups; crosslinking may be inter- or intra-molecular. Examples of crosslinking agents are known in the art and include, for example aldehyde (a di-, trialdehyde), an epoxide (a di-, tri- or poly epoxide, or "epoxy resin"), a mono, di- or tri-isocyanate crosslinking agent, a melamine resin, phenolic resins or the like. A hardener may be used with some crosslinking agents. For example, an anhydride (e.g. MHHPA) may be used with an epoxy cure. An accelerant (catalyst) may be used to facilitate curing of the switching material.

Additionally, switching material or compositions according to various embodiments may further comprise one or more other additives, such as dyes, UV light stabilizers, antioxidants, salts, surfactants, adhesion promoters, charge carriers, charge compensators or the like.

Photochromic and Electrochromic Compounds ("Hybrid P/E" Compounds):

Examples of compounds having electrochromic and photochromic properties include hybrid P/E compounds. Hybrid P/E compounds are generally organic, and include classes of compounds from the hexatriene family (e.g. diarylethenes, dithienylcyclopentenes, and fulgides). Oxidation of the hybrid P/E compound to convert the ring-closed form to the ring-open form may be induced by application of a voltage to a switching material comprising the compound, and may be independent of the polarity of the applied voltage. The hybrid P/E compound may be an anodic species, that is, the electrochromic colour change (electrochromic fading, electrochromic transition from a dark state to a light state) occurs primarily at the anode of an electrochromic film or device.

Oxidative conditions are those where a compound according to various embodiments undergoes a loss of an electron, at least transiently. Oxidation may occur with application of a voltage (electrochemical conditions, or oxidative electrochemical conditions) or with the application of light from a light source (photochemical conditions).

Compounds according to various embodiments may undergo catalytic electrochemical oxidation. The electrochemical conditions may be catalytic conditions, and compounds according to various embodiments may undergo catalytic electrochemical oxidation. Catalytic electrochromism of selected diarylethenes has been demonstrated and is described in U.S. Pat. No. 7,777,050. The electrochemical conditions may be catalytic conditions and methods of switching, or operating, a switching material from a dark to a faded state may employ application of a catalytic electric charge. A catalytic amount of an electric charge may be positive or negative, and may be from about 0 to about 5 volts, or any amount or range therebetween. One or more hybrid P/E compounds may be present in a switching material in an amount (% weight) of about 0.05% to about 30%, or any amount or range therebetween, for example about 1, 2, 3, 4, 5, 6, 7, 8, 9, 10, 11, 12, 13, 14, 15, 16, 17, 18, 19, 20, 21, 22, 23, 24, 25, 26, 27, 28 or 29%.

Hybrid P/E compounds (1,2-diaryl cyclopentene compounds) reversibly convertible between a ring-open isomer and a ring-closed isomer are described in U.S. Pat. No. 7,777,055, WO2010/142019 and PCT Publication WO2013/044371. Some non-limiting examples of photochromic and electrochromic diarylethene compounds include (for brevity, only the ring-open isoform is shown):

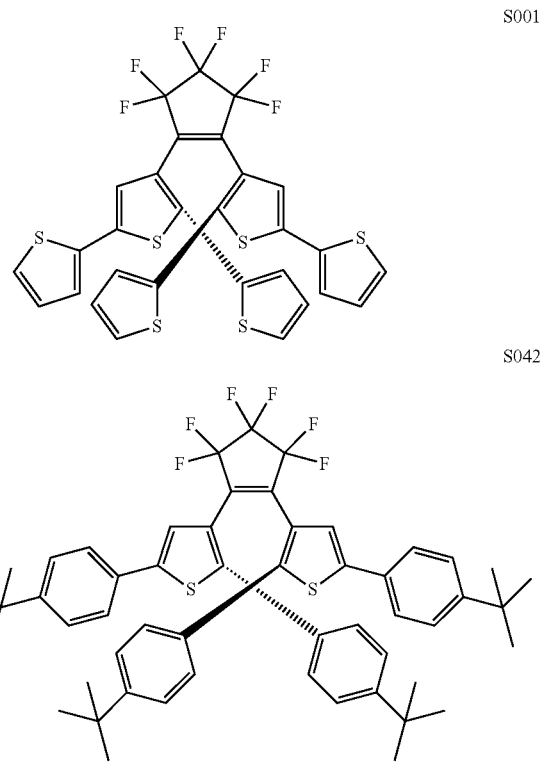

S098

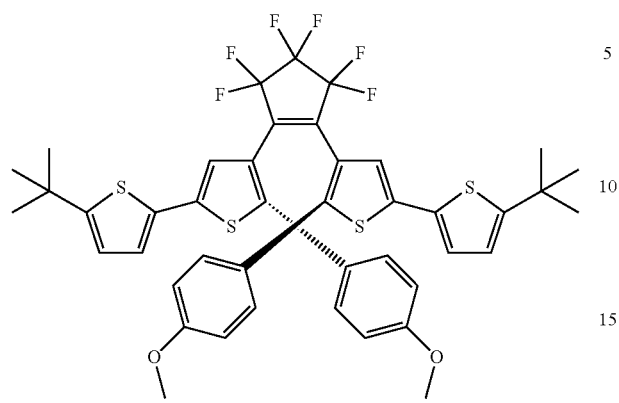

S108

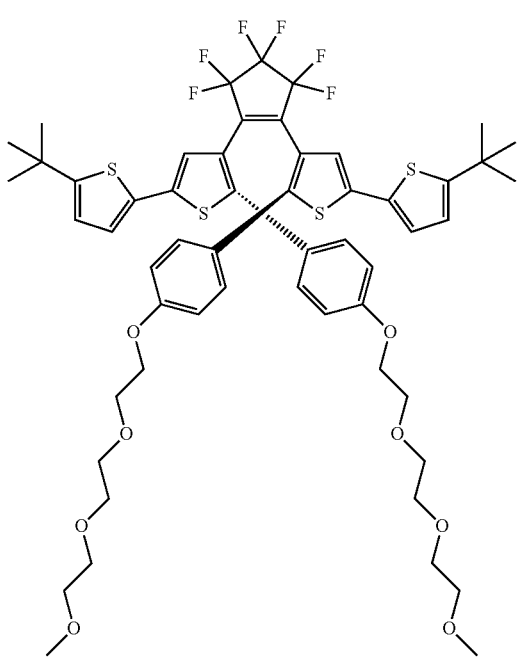

S109

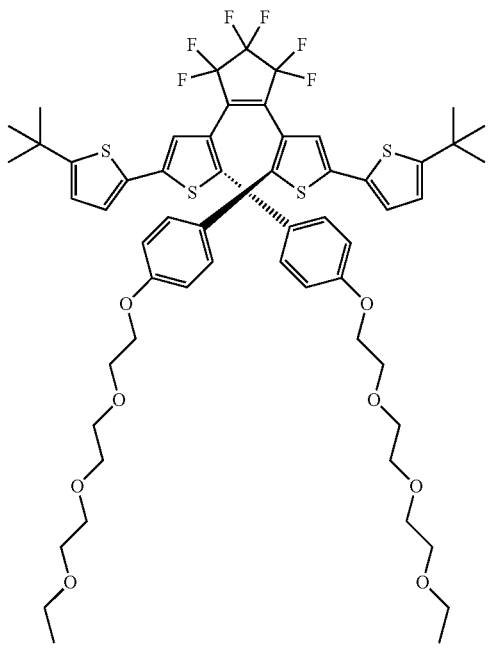

S158

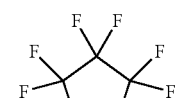
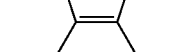

Additional Layers

Transmission of light in the UV or IR may be blocked (by absorption or reflection) by one or more layers in the optical filter or laminated glass. The optical filter or laminated glass may transmit some, all or none of the incident UV light, or some all or none of the incident IR light.

IR-Blocking:

One or more layers may comprising an IR-blocking component. A solar control film may be included in the optical filter or laminated glass. Examples of such films include US 2004/0032658 and U.S. Pat. No. 4,368,945. Alternately IR blocking materials may be incorporated into a layer of glass, or an adhesive layer. An IR blocking layer may reflect or absorb IR light. Reflection of IR may reduce the solar heat gain of an interior space, whereas absorption of IR may increase the temperature of the laminated glass, which may be advantageous in increasing the switching speed of the variable transmittance optical filter. Examples of IR blocking layers include XIR 75 (Southwall), transparent metal oxides, "low-E" coatings or the like. In some embodiments, inclusion of an IR blocking layer may reduce the temperature of the switching material. Reduction of the temperature of the switching material may increase the weathering performance of the switching material.

UV-Blocking:

One or more layers may comprise a UV blocking component. Adhesive layers such as PVB may have additives that block UV (e.g. U.S. Pat. No. 6,627,318); some transparent layers (e.g. layers 66 or 68), or some substrates (e.g. layers 54 or 56) may be made of a material that has been treated with a UV blocking material (e.g. UV-blocking PET), or have a UV blocking layer applied thereto. It may be cost effective to incorporate into the variable transmittance optical filter a substrate that blocks UV—this may be advantageous in protecting the switching material from some incident UV light. Surprisingly, the variable transmittance optical filter will still switch even when a UV blocking substrate that blocks 50% or more of incident UV light of 370 nm, 380 nm, 400 nm, 420 nm, 435 nm or greater (a 50% cutoff filter). In some embodiments, the UV blocking layer may be, or comprise, PVB, or PET.

Sound Insulation:

Sound insulation may be provided by an acoustic layer. Acoustic PVB may be known by trade names such as SAFLEX™ or VANCEVA™. U.S. Pat. No. 5,190,826 describes composition comprising two or more layers of resins of differing polyvinyl acetals; the acoustic layer may be in the range of 0.2 to 1.6 mm. U.S. Pat. No. 6,821,629 describes an acoustic layer comprising an acrylic polymer layer and polyester film layer. Acoustic layers comprising PVC, modified PVC, polyurethane or the like may also be used.

Self-Cleaning Coating:

a self-cleaning coating may be applied to an outboard surface of the laminated glass, for example surface 20. Several examples of such coatings, and methods of applying them are known—examples include hydrophilic coatings based on $TiO_2$ (e.g. Pilkington ACTIV™) and hydrophobic coatings (e.g. AQUACLEAN™ or BIOCLEAN™)

Security Coating:

A security coating may be applied to the laminated glass to prevent release of glass particles from laminated glass failure (breakage). Examples of such materials include PVB/PET composites or hard-coated PET films (e.g. SPALLSHIELD™ (DuPont).

Anti-Scratch:

an abrasion-resistant coating may be applied to the laminated glass to prevent distortion or surface damage, and preserve optical clarity; anti-scratch coatings may be particularly beneficial for use with organic glass.

Coatings or treatments applied to the inboard or outboard surfaces of laminated glass are generally optically clear. Other examples of coatings or treatments may include anti-glare or anti-reflective coatings.

Preparation of Optical Filters

Some methods of preparing optical filters and switching material are described in WO2010/142019, and in International patent application No. PCT/CA2013/000339 filed Apr. 9, 2013. A switching material may be coated at a suitable thickness onto a conductive coating of a substrate (e.g. ITO-coated PET) using a slot die, knife coater, roll-to-roll coating method or the like. A second layer may be attached on the switching material—the second layer may be a transparent conductive layer, or a substrate comprising a transparent conductive material (e.g. ITO coated PET). The step of attaching the second layer may be preceded by, or followed by, a step of crosslinking or curing of the switching material. The step of curing may comprise heating the switching material to a temperature suitable for crosslinking (e.g. about 50 to about 90° C., or any amount or range therebetween. The step of disposing may be preceded by a step of filtration.

Substrate

A substrate may be rigid or flexible—an optical filter comprising one or more flexible substrate(s) may be in the form of a film that may be applied to a rigid material, such as a pane of a window, or a lens. A substrate may comprise glass, plastics or thermoplastic polymers. Examples of glass include float glass, tempered glass, tinted glass, mirrored glass, reinforced glass, monolithic glass, multilayered glass, safety glass, bullet-resistant glass or "one-way" bullet-resistance glass. Examples of thermoplastic polymers include polyesters (PE), polycarbonates, polyamides, polyurethanes, polyacrylonitriles, polyacrylacids, (e.g. poly(methacrylic acid), including polyethylene terephthalate (PET), polyolefins (PO) or copolymers or heteropolymers of any one or more of the above, or copolymers or blends of any one or more of the above with poly(siloxane)s, poly(phosphazenes)s, or latex. Examples of polyesters include homopolymers or copolymers of aliphatic, semi-aromatic or aromatic monomeric units, for example polycondensed 4-hydroxybenzoic acid and 6-hydroxynapthalene-2-carboxylic acid (VECTRAN™), polyethylene napthalate (PEN), polytrimethylene terephthalate (PTT), polybutylene terephthalate (PBT), polyethylene terephthalate (PET), polyhydroxyalkanoate (PHA), polyethylene adipate (PEA), polycaprolactone (PCL) polylactic acid (PLA), polyglycolic acid (PGA) or the like. Examples of polycarbonates include bisphenol A, polycarbonate or the like. Examples of thermoplastic polymers include polyethene (PE), polypropylene (PP) and the like. The substrate may have UV, IR or VIS light blocking characteristics. Other examples of substrate materials include ceramic spinel or aluminum oxynitride.

The substrate may be of uniform or varying thickness, and of any suitable dimension. For example, the substrate may have a thickness from about 0.01 mm to about 10 mm, or any amount or range therebetween, for example 0.05, 0.1, 0.5, 1, 2, 3, 4, 5, 6, 7, 8, 9 or 10 mm, or from about 0.012 mm to about 10 mm, or from about 0.5 mm to 10 mm, or from about 1 mm to 5 mm, or from about 0.024 mm to about 0.6 mm, or from about 0.051 mm (2 mil) to about 0.178 mm (7 mil). In some embodiments, the thickness and/or material of a first substrate differs from the thickness and/or material of a second substrate. In some embodiments, a substrate with a conductive layer may be ITO-coated glass, or ITO-coated PET.

In some embodiments, the substrate may be a moving web. The first and/or second substrates may be independently opaque or transparent, or substantially transparent. The substrate may be optically clear. In some embodiments, when the switching material is disposed upon, or sandwiched between the substrate(s), the switching material is optically clear (e.g. demonstrating a haze of less than about 5%, less than about 4%, less than about 3%, less than about 2% or less than about 1%). Haze may be measured using methods known in the art, for example use of an XL-211 Hazemeter from BYK-Gardner, according to manufacturer's instructions.

A transparent conductive layer (electrode) may comprise, for example, metals, metal alloys, metal oxides, conjugated organic polymers, conductive carbon-rich materials and fine wire meshes. Exemplary conductive materials include layers of indium tin oxide (ITO), doped tin oxide, doped zinc oxide, doped cadmium oxide, fluorine tin oxide, antimony tin oxide, cubic strontium germanium oxide, polyaniline, graphene, fullerenes, carbon nanotubes, PEDOT (poly(3,4-ethylenedioxythiophene)), PEDOT:PSS (poly(3,4-ethylenedioxythiophene) poly(styrenesulfonate)), and polypyrrole, as well as thin, substantially transparent metallic layers such as gold, silver, aluminum, and nickel alloy. Methods of applying the electrically conductive material to a substrate to form suitable conductive layers and electrodes are known, for example chemical deposition, sputter coating or the like. The conductive layer may be of thickness that provides adequate conductance for operation of the electrodes, and which does not appreciably interfere with the transmission of light. The thickness of the conductive layer may be from about 1 nanometer to about 90 microns, or any amount or range therebetween. In some embodiments, a conductive material may be dissolved in a suitable solvent and cast in a layer (a transparent conductive layer), and used in a composite optical filter without being applied to a substrate. Such a layer may be of any suitable thickness, from about 0.05, 0.1, 0.5, 1, 2, 3, 4, 5, 6, 7, 8, 9 or 10 mm or any amount or range therebetween.

In some embodiments, the conductive transparent layer(s) may have a sheet resistance of from about 100 Ohms/square to about 10,000,000 Ohms/square; or any amount or range therebetween.

The switching material may have a high viscosity at room temperature and may be made into a lower-viscosity liquid by heating to allow it to be applied or coated onto the substrate. In one embodiment, the switching material is heated to about 100° C. and pressed between the substrates. Alternately, the switching material may be cast as a liquid and then further treated to increase the viscosity of the material to form a gel—the switching material may be dried (evaporation of a co-solvent), or a switching material comprising a crosslinkable resin may be cured to increase the viscosity to form a gel. Curing the switching material may be accomplished with temperature or UV light; other methods may be suitable with different formulations. This polymerization and/or cross-linking can be initiated by chemical-, thermal-, or photo-type initiators. The switching material may then adhere to conductive layers on first and second substrates to form an integral structure. In some embodiments, components of the switching material or composition may be combined in particular order, or in particular sub-combinations ('parts'), with the parts combined at a later point. Preparation of first, second and/or third parts may be advantageous to solubilize one or more components of a composition, prevent side reactions, or to prevent initiation of crosslinking ('curing') before the formulation is complete or ready for casting or coating. For example, a switching material for coating on a substrate may be prepared according to the steps of: providing a first part comprising a crosslinkable polymer, a hybrid P/E compound, an ionic material and a first portion of a solvent; providing a second part comprising an optional hardener, a crosslinking agent and a second portion of the solvent; providing an accelerant and an optional co-solvent (e.g. MEK, THF or the like); combining the first part and the second part; and combining the third part with the combined first and second parts. Disposition of the switching material may be performed in an environment of reduced oxygen (e.g. less than 100 ppm) and/or reduced humidity (e.g. less than 100 ppm relative humidity)

A suitable thickness may be selected such that the composition is of the desired thickness once the co-solvent is evaporated (if the switching material comprises a co-solvent), or the final layer is of the desired thickness following cooling and/or crosslinking of the coated switching material. For example, to obtain a final thickness of about 50 microns, a switching material with co-solvent may be applied to the substrate in a layer of about 100 to about 120 microns.

Once the filter has been made, it can be cut to size, sealed around the perimeter if necessary, and an electrical connection can be made to the electrodes (conductive layers). The electrical connection can be made by printing bus bars onto the substrates in contact with the transparent conductive coating. In some embodiments, busbars may be printed on the substrate before disposition of the switching material, or before lamination of the substrate to the switching material. Electrical leads (electrical connectors, connectors) can then be attached to the bus bars.

Busbars, Electrical Connectors and Control Circuits:

Busbars may be applied to a portion of the conductive layer on opposing sides of the switching material, so that a voltage differential is created across the switching material to effect the switch. The busbars may be of any suitable material to provide a low-profile conductive area suitable for attachment of an electrical connector thereto. Examples of suitable materials include conductive adhesive, conductive ink, conductive epoxy, metal mesh or film or the like, comprising at least one type of metal such as aluminum, gold, silver, copper or the like. The conductive material may be applied to the conductive surface by any of several methods, including printing, painting, screenprinting ('silk-screening') or the like. Electrical connectors or leads may be of any suitable material and may be affixed to the busbar by any suitable methods, including adhesion (conductive adhesive or conductive epoxy), clips, rivets or the like. Suitable material for electrical connectors may include conductive tape, wire or the like.

A control circuit can be used to switch the electrical voltage on or off, based on input from an automated or semi-automated device (e.g. an irradiance meter, thermometer), a building or vehicle environmental control system, a user or some other input, and can also be used to modulate the voltage to a predetermined level. A power source for may include an AC line voltage in a house or other building, a DC power source (e.g. a battery of a vehicle, or in a separate battery or power pack), an energy harvesting power source (e.g. solar panel) or the like. The control circuit may comprise one or more switches (transistor, relay, or electro-mechanical switch) for opening and closing a circuit between the voltage regulators and the optical filters, an AC-DC and/or a DC-DC converter for converting the voltage from the power source to an appropriate voltage; the control circuit may comprise a DC-DC regulator for regulation of the voltage. The control circuit can also comprise a timer and/or other circuitry elements for applying electric voltage to the variable transmittance optical filter for a fixed period of time following the receipt of input.

Embodiments include switches that can be activated manually or automatically in response to predetermined conditions. For example, control electronics may process information such as time of day, ambient light levels detected using a light sensor, user input, stored user preferences, occupancy levels detected using a motion sensor, or the like, or a combination thereof, the control electronics configured to activate switches for applying voltage to the optical filter in response to processed information in accordance with predetermined rules or conditions. Where the optical filter according to various embodiments is part of an automotive glazing (window or sunroof, or the like), the glazing may be installed in the vehicle and electrically connected to the vehicle's electrical system, through wiring in the frame, dash or roof, or connected to rails or guide tracks as may be used for some automotive roof applications.

In one embodiment, the control electronics comprises a user-activated switch that passes the DC voltage from the power source substantially directly to the variable transmittance optical filter. The user activated switch can be a normally-open push button, or another type of switch. A switch may be configured to remain closed for a predetermined amount of time following actuation, thereby facilitating application of voltage to the optical filter for sufficient time to effect a state transition.

The voltage to be applied for transitioning the optical filter may be from about 0.1 V to about 20 V, or any amount or range therebetween. In some embodiments, the amount of voltage applied is from about 0.1V to about 5V, or from about 1V to about 10 V, or from about 1.0 V to about 2.2 V, or from about 0.5V to about 3V, or from about 1.2V to about 2.5 V, or from about 1.8 V to about 2.1 V, or any amount or range therebetween. In some embodiments, the voltage applied is less than about 12 V, or less than about 6 V, or less than about 3 V or less than about 2.5 V, or about 2 V.

The variable transmittance layer may be laminated between layers of glass.

Glass Lamination (for Weathering and Testing Devices):

In some embodiments, an optical filter comprising a variable transmittance layer may be laminated between layers of glass. Once the switchable film has been made, and busbars and optional electrical connectors attached, this layer may be attached with an adhesive to a sheet of glass, or laminated between two layers of an adhesive resin and that between two sheets of glass. A "sandwich" of glass—adhesive—switchable film—adhesive—glass may be placed in a Carver press (Carver Inc. Wabash Ind.) and pressed at ~55-90 psi at 135° C. for 40 minutes, with ramp-up and cool down periods of about 10 minutes.

In another method, the sandwich may be placed in an evacuated bag, sealed to maintain the vacuum, and incubated in an oven with an initial bonding at a temperature of about 70° C.-110° C. An optional, second bonding step may be performed at a temperature of about 120° C.-140° C., with pressure (e.g. about 0.95 to about 1.5 MPa in an autoclave).

In another method, the sandwich may be passed through a press roll or pressed between plates at an elevated temperature (about 90° C. to about 140° C.—pressure and temperature may be increased and decreased over several steps), or may be placed in a bag (rubber), with an initial bonding at a temperature of about 70° C.-110° C., while applying a vacuum to remove air between the layers. A second bonding step is then performed at a temperature of about 120° C.-150° C., with pressure (e.g. about 0.95 to about 1.5 MPa in an autoclave).

The overall thickness of the laminated glass is dependent, in part on the thickness of the various layers, generally an overall thickness of about 6.3 to about 6.6 mm is preferred. Performance of laminated glass or multi-layer compositions as described herein may be tested by conducting studies using standard techniques in the art, for example, measurement of VLT, $LT_A$, color, haze, switching speed, photostability, and/or durability. WO2010/142019 describes methods, equipment and techniques that may be used to assess the performance of optical filters.

A laminated glass comprising an optical filter may be subjected to testing according to performance or safety standards. In some embodiments a laminated glass comprising an optical filter may meet or exceed the performance required by ANSI Z26.1, SAEJ673, ECE-R43, ANSI Z97.1, or similar performance standards in other jurisdictions.

The term "mil" as used herein, refers to the unit of length for ¹⁄₁₀₀₀ of an inch (0.001). One (1) mil is about 25 microns; such dimensions may be used to describe the thickness of an optical filter or components of an optical filter, according to some embodiments. One of skill in the art is able to interconvert a dimension in 'mil' to microns, and vice versa.

"About" as used herein when referring to a measurable value such as an amount, a temporal duration, and the like, is meant to encompass variations of ±20% or ±10%, more preferably ±5%, even more preferably ±1%, and still more preferably ±0.1% from the specified value, as such variations are appropriate to perform the disclosed methods.

Embodiments are illustrated, in part, by the following non-limiting methods and examples:

General Methods

Preparation and Lamination of Variable Transmittance Layer:

Alpha 5 switching material comprising 2,2,4-Trimethyl-1,3-pentanediol monoisobutyrate (Texanol™)(79.1 wt %), Butvar B72 PVB (8.5 wt %), DER 736 (0.8 wt %), MHHPA (0.7 wt %), AMC-2 (0.8 wt %), $TBABF_4$ (2 wt %) and 10 wt % photo/electrochromic compound (S109 or S158) was prepared, and combined 1:1 with co-solvent (MEK). This composition was coated on an ITO-coated PET substrate to provide a final thickness of about 1-2 mil, the co-solvent evaporated and laminated with a second ITO-coated PET substrate and allowed to complete curing overnight at 80° C. The 'sandwich' structure was cut to the desired size, sealed and electrical contacts added.

Alpha 6.1 switching material comprising Texanol™ (76.79 wt %), Butvar B72 PVB (6 wt %), Desmodur N3600 (0.2 wt %), Zn Octoate (0.1 wt %), TBA-TFSI (2 wt %) and 15 wt % photo/electrochromic compound (S109 or S158) was prepared, and combined 1:1 with co-solvent (THF) for coating and lamination as described for alpha 5 films.

Alpha 6.2 switching material comprising Texanol™ (65.27 wt %), 1,2-butylene carbonate 11.52%, Butvar B72 PVB (6 wt %), Desmodur N3600 (0.2 wt %), Zn Octoate (0.1 wt %), TBA-TFSI (2 wt %) and 15 wt % photo/electrochromic compound (S109 or S158) was prepared, and combined 1:1 with co-solvent (THF) for coating and lamination as described for alpha 5 films.

Alpha 8.4i switching material comprising Rhodiasolv IRIS (68.76 wt %), Butvar B72 PVB (5 wt %), Mowitol B300HH (10 wt %) Desmodur N3600 (0.21 wt %), Zn Octoate (0.04 wt %), TBA-TFSI (1 wt %) and 15 wt % photo/electrochromic compound (S109 or S158) was prepared, and combined 1:1 with co-solvent (THF) for coating and lamination as described for alpha 5 films.

Glass Lamination:

Once the variable transmittance layer has been made, and busbars and optional electrical connectors attached, this layer may be attached with an adhesive to a sheet of glass, or laminated between two layers of an adhesive resin and that between two sheets of glass. Laminated glass according to various embodiments of the invention may be produced in the same production method as usual (non-switching) laminated glass. The glass-interlayer sandwich may be passed through a press roll, pressed between plates at an elevated temperature (about 90° C. to about 140° C.—pressure and temperature may be increased and decreased over several steps), or may be placed in a bag (rubber), with an initial bonding at a temperature of about 70° C.-110° C., while applying a vacuum to remove air between the layers. A second bonding step is then performed at a temperature of about 120° C.-150° C., with pressure (e.g. about 0.95 to about 1.5 MPa in an autoclave).

The overall thickness of the laminated glass is dependent, in part on the thickness of the various layers, generally an overall thickness of about 6.3 to about 6.6 mm is preferred.

Assessment Methods:

Performance of optical filters or apparatus comprising an optical filter may be tested by conducting studies using standard techniques in the art, for example, measurement of VLT, $LT_A$, color, haze, switching speed, photostability, and/or durability. WO2010/142019 describes methods, equipment and techniques that may be used to assess the performance of optical filters.

Photochemical Darkening and Fading; Electrochemical Fading

Laminated glass or optical filters are exposed to UV light to darken the switching material, resulting in a decrease in the light transmittance of the material in the visible range. An electric charge of about 2 Volts is then applied to the switching material for 3 minutes, causing the switching material to switch to a faded state. In the faded state, more light is permitted to pass through the switching material resulting in an increase in light transmittance in the visible range. VLT or $LT_A$ in both dark and faded states is measured using an Ocean Optics spectrometer, and a contrast ratio may be calculated ($LT_A$ faded state/$LT_A$ dark state).

Photostability:

For photostability assessment, samples were prepared and weathered in a QSUN Weatherometer (Q-Labs) at 0.68 W/m². Devices were initially darkened on the QSUN for 1 hour and an initial dark state transmission spectra obtained using an Ocean Optics spectrometer. Each device was subsequently photo-faded using a low pressure sodium lamp with yellow filter (400-500 nm cutoff), and an initial faded state transmission spectra obtained. Devices were returned to the QSUN and spectra taken twice weekly until failure.

Photostationary State (PSS)

Absorption spectra over the visible range (380-780 nm) were obtained using an OceanOptics™ Spectrophotometer. A $2 \times 10^{-5}$M solution of compound in solvent is prepared, and photofaded using visible light until absorption in the visible region of the spectrum stabilizes. The sample is then irradiated with simulated sunlight (QSUN SS-150 Solar Simulator with xenon arc lamp) until the absorption spectrum stabilizes. To obtain PSS in the presence of a UV blocking film (if desired), a second sample is prepared and irradiated as described, with a UV blocking film inserted in the light path when irradiating.

Film modeling: To obtain the scaled data for the film or film models, dark and light state absorption spectra were obtained using an Ocean Optics spectrophotometer as described.

The array of absorbance data (cuvette) for each wavelength (380-780 nm) integer is multiplied by a scaling ratio (equation 2)

$$\frac{Path_{cuvette} \times Conc._{cuvette}}{MW_{chromophore\ I}} \div \frac{Path_{film} \times Conc._{film}}{MW_{chromophore\ I}} = \text{Scaling ratio} \quad (2)$$

to provide an array of modeled film absorbance profile (equation 3):

$$\begin{bmatrix} Abs380 \\ \cdots \\ Abs780 \end{bmatrix}_{cuvette} \times \text{Scaling ratio} = \begin{bmatrix} Abs380 \\ \cdots \\ Abs780 \end{bmatrix}_{film} \quad (3)$$

The resulting array of the absorbance profile has a lambda max of the same wavelength as the cuvette data.

In some embodiments, the film thickness (film path length, or $Path_{film}$) may be from about 0.5 mil to about 3 mil, or about 0.5, 0.75, 1, 1.2, 1.4, 1.6, 1.8, 2.0, 2.2, 2.4, 2.6, 2.8 or 3. Chromophore MW may be determined from the structure of the compound; concentration of chromophore in the film may be of any suitable value.

Individual film spectra may be obtained from single films in both dark and faded states. For a dark state spectra, films were exposed to simulated sunlight (Agro-Brite™ High output T5, 24 W/6400K fluorescent lamp, Hydrofarm Agricultural Products) until a stable dark state was attained; for faded state, films were photofaded using a low-pressure sodium lamp (yellow light) until a stable faded state was attained. Transmission spectra were obtained using an Ocean Optics™ spectrophotometer.

Example 1: Color Balance in Faded State

Light transmission spectra of a switching material comprising a compound with an observed green-blue color in the dark state and a pale yellow in the faded state (S109) is shown in FIG. 1. In a faded state, about 80% $LT_A$ is observed, and an $LT_A$ of about 7% is observed for the dark state.

FIG. 2 illustrates the transmission spectra for a 'stack' comprising the switching material of FIG. 1 and a color balancing layer, providing a near neutral color in the faded state. For each component of a optical filter (color balancing layer, variable transmittance layer, light-attenuating layer, other layers and the like) a spectrum and L*a*b* values are obtained. The spectra for each component are multiplied to provide a resultant spectrum, and resultant L*a*b* values derived from the resultant spectrum. In this manner, a variety of color balancing layer spectra and L*a*b* values may be substituted in the modeled resultant spectrum, to allow for comparison of the resultant L*a*b* values and allow selection of the combination of layers that provides a closest match to the target color in the dark or faded state (for this example, the target color is a neutral grey color in the faded state).

For the spectra illustrated in FIG. 2, the color balance layer selected was GamColor 970. Transmission peaks in the 430-490 nm and 550-640 nm ranges have been altered to have a similar magnitude. While the light transmission over the illustrated range (380 nm to 780 nm inclusive) is not equal, the resulting transmitted light is neutral, having a* and b* values near zero. Thus, it is not required to have a uniform level spectrum in a variable transmittance optical filter of an optical filter, or laminated glass to achieve a neutral color.

Example 2: Color Comparison of Switchable Material in Faded or Dark State

Laminated glass stacks were mathematically modeled to examine the scope of matching switching materials to a target color. For example, to match a 'grey glass' with an L*a*b* of 41.7, −2.7, 3.9 and an $LT_A$ of 12.4 was selected as the target color and compared to switchable material in the dark or faded state of the switchable material; a color balancing layer was included in the predicted layer configurations ("stack") to model the desired colour neutralization to match the grey glass in a dark or faded state for the indicated chromophore. All switching materials were modeled for a film thickness of 25 μm and chromophore loading of 10 wt %. Information concerning the modeled laminated glass comprising a variable transmittance layer is provided in Table 1.

TABLE 1

L*a*b*, delta C (comparing target color to stack color) and delta E (comparing target color to stack color) values of modelled stacks comprising S109 or S158 hybrid photo/electrochromic compounds in dark or faded state.

|  | Match to faded state | | Match to dark state | |
| --- | --- | --- | --- | --- |
|  | 10 | 11 | 14 | 15 |
| delta C (target to stack) | 0 | 0 | 0 | 0.3 |
| delta E (target to stack) | 0 | 0.1 | 0 | 0.5 |
| chromophore | S158 | S109 | S158 | S109 |
| faded state (L*a*b*) | 90.8, −15.1, 38.3 | 92.0, −10.2, 21 | 90.8, −15.1, 38.3 | 92.0, −10.2, 21 |
| dark state (L*a*b*) | 68.2, −50.8, 7 | 62.4, −52.8, −7.1 | 68.2, −50.8, 7 | 62.4, −52.8, −7.1 |
| faded stack (L*a*b*) | 41.7, −2.7, 3.9 | 41.7, −2.7, 3.9 | 63.8, 31.3, 32.9 | 75.5, 35.8, 35.1 |
| dark stack (L*a*b*) | 29.5, −17.7, −8.9 | 25.5, −23.3, −6.4 | 41.7, −2.7, 3.9 | 41.5, −3.1, 3.9 |
| $LT_A$ range (dark-light) | 4.9-12.4 | 3.5-12.4 | 12.4-40.4 | 12.3-61.2 |
| contrast ratio | 2.5 | 3.5 | 3.3 | 5 |

Color Matching to a Faded State:

Both chromophores exhibit varying degree of yellow-tinge in the faded state, thus a color balancing layer with a blue component was modelled to manipulate the transmitted light to achieve a grey color in the target range. Light transmission of stacks for both chromophores was able to be manipulated to provide a suitable grey color in the faded state (delta C of less than 10, and a VLT in the faded state of at least 10%). In the dark state, S109 and S158 exhibited a suitable dark blue-green color. The delta C values for these samples indicate that the target color range was attained.

Color Matching to a Dark State:

the observed color of switching materials comprising S109 or S158 in a dark state may be describe as blue-green. When color matching to a dark state, a delta C of less than 10, along with an $LT_A$ of 10% or more in the dark state was considered to be suitable. Chromophores S158 and S109 (blue-green in their dark state) were measured. and a color balancing layer with a pink color component was used to manipulate the transmitted light to achieve a grey color in the target range. The deltaC values for these samples indicate that the target color range may be attained, with the faded states providing a grey-orange color.

These results demonstrate that matching a target color within a specified range and/or $LT_A$ can be predicted for a variety of switching materials. Suitability of a particular match in the faded or dark state with a target color or range may be dependent on the intended use of the laminated glass or optical filter.

Example 3: Matching a Non-Neutral Color

A laminated glass with a blue dark state (L*=32.5, a*=−20.8, b*=−17.2, and neutral in the faded state) and an $LT_A$ of about 2-26% was selected as the target colors (targeted to match in both faded and dark states. Laminated glass with a blue switchable region may be produced by inclusion of an optical filter comprising a variable transmittance layer and a color balancing layer. Information regarding the proposed color and characteristics is provided in Table 2.

TABLE 2

Switchable material descriptors

| parameter | |
| --- | --- |
| delta C (target to stack) | 18 |
| delta E (target to stack) | 19.8 |
| chromophore | S109 |
| wt % | 15% |
| film thickness | 1.5 mil |
| faded state (L*a*b*) | 91.2, −13.2, 33.1 |
| dark state (L*a*b*) | 41, −65.3, −14.8 |
| faded stack (L*a*b*) | 58.1, −0.5, 0.2 |
| dark stack (L*a*b*) | 25.6, −39.8, −21.7 |
| $LT_A$ range (dark-light) | 2.3-25.8 ($LT_A$) |
| $LT_A$ contrast ratio | 11 |

In this example, the color in the dark and the faded states are close to the target colors of a blue in the dark state, and a neutral color in the faded state.

Example 4: Effect of Film Thickness and/or Chromophore Load on Contrast Ratio of Optical Filters Chromophore loading and thickness of cast films were modeled to investigate the contrast ratio of various laminated glass compositions. $LT_A$ values for laminated glass compositions comprising a switching material of varying thickness and chromophore loading were determined. The laminated glass composition comprised a switchable optical filter comprising chromophore S109 and a static filter selected such that the faded stack most closely matched a target spectrum having a neutral color and an $LT_A$ of 37% in the faded state. Tables 3 and 4 set out the $LT_A$ in dark and faded, states respectively, for a range of thickness and S109 wt %; Table 5 sets out the contrast ratio of the laminated glass compositions.

TABLE 3

$LT_A$ in dark states for films of varying thickness and chromophore load

| | film thickness | | | | |
|---|---|---|---|---|---|
| wt % | 0.5 | 1 | 1.5 | 2 | 2.5 |
| 5 | 34.9 | 20.9 | 15 | 8.5 | 6.6 |
| 7.5 | 29.3 | 15 | 7.7 | 4.6 | 3.5 |
| 10 | 20.9 | 8.7 | 4.5 | 3 | 2.3 |
| 12.5 | 14.6 | 5.1 | 2.4 | 1.5 | 1.1 |
| 15 | 12 | 3.4 | 1.8 | 1 | 0.6 |
| 17.5 | 10.9 | 2.9 | 1.6 | 0.8 | 0.5 |
| 20 | 7.2 | 2.4 | 1.1 | 0.6 | 0.2 |

TABLE 4

$LT_A$ in faded states for films of varying thickness and chromophore load

| | film thickness | | | | |
|---|---|---|---|---|---|
| wt % | 0.5 | 1 | 1.5 | 2 | 2.5 |
| 5 | 50.6 | 43.1 | 42.2 | 32.8 | 32.7 |
| 7.5 | 50.6 | 42.3 | 32.8 | 29.9 | 25.9 |
| 10 | 43.1 | 32.7 | 25.8 | 25.8 | 25.8 |
| 12.5 | 43.1 | 32.7 | 25.9 | 25.7 | 19.6 |
| 15 | 42.3 | 29.9 | 25.8 | 19.6 | 19.5 |
| 17.5 | 42.1 | 25.8 | 25.5 | 19.4 | 19.2 |
| 20 | 32.8 | 25.7 | 19.5 | 19.3 | 14.2 |

TABLE 5

Contrast ratios

| | film thickness | | | | |
|---|---|---|---|---|---|
| wt % | 0.5 | 1 | 1.5 | 2 | 2.5 |
| 5 | 1.4 | 2.1 | 2.8 | 3.9 | 5.0 |
| 7.5 | 1.7 | 2.8 | 4.3 | 6.5 | 7.4 |
| 10 | 2.1 | 3.8 | 5.7 | 8.6 | 11.2 |
| 12.5 | 3.0 | 6.4 | 10.8 | 17.1 | 17.8 |
| 15 | 3.5 | 8.8 | 14.3 | 19.6 | 32.5 |
| 17.5 | 3.9 | 8.9 | 15.9 | 24.3 | 38.4 |
| 20 | 4.6 | 10.7 | 17.7 | 32.2 | 71.0 |

A range of contrast ratios can be provided by varying chromophore loading, film thickness or both. A contrast ratio of 8 or greater may be obtained in a laminated glass composition having at least 10% chromophore load, and/or at least a 1 mil thick.

Example 5: Attenuation of Incident Light

Light incident on the variable transmittance layer may be selectively attenuated by placing a filter outboard of the variable transmittance layer. This light attenuation layer may be selected to address, for example, photostability, durability or kinetics of the switching material, and may also affect the contrast ratio of the transmitted light.

Figure 11:
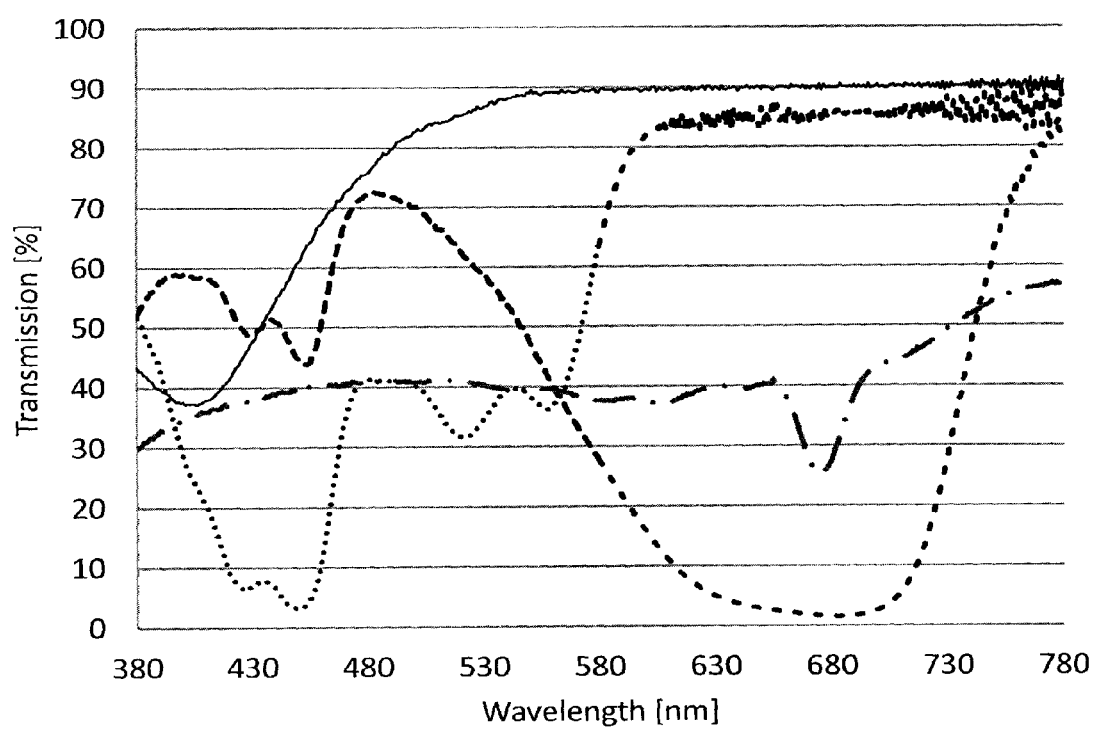
FIG. 11 shows light transmission spectra for each of four light attenuation layers—Rosco 07 Pale yellow—solid line; Gamcolor 1543 Full CTO—dotted line; Rosco 4390 CalColor 90 Cyan—dotted line; Rosco 398 Neutral Grey—long dash-dot line, according to another embodiment.

Light attenuation layers were applied to variable transmittance layers comprising S109 and the effect of this layer on light transmission and contrast ratio considered when darkening under artificial sunlight (QSUN) and electrofading in the presence (EF in QSUN) or absence (EF) of artificial sunlight. Table 6 summarizes the results of adding these filters atop the formulation including the color, contrast ratio (CR), and $LT_A$ in both dark (in QSUN) and faded (EF) state for both neutral color matching in the faded state and not. FIG. 11 shows light transmission spectra for each of the four filters, exemplifying the widely varying spectra that may be employed for selective manipulation of optical filter spectra to approximate a target color.

TABLE 6 effect of light attenuation layer on light transmission and contrast ratio.

| Filter | | QSUN | EF in QSUN | EF | Color Matched | |
|---|---|---|---|---|---|---|
| | | | | | CR | LTA |
| None | L*a*b* | 50.5, −62.5, −13.7 | 67.3, −48.8, 3.1 | 90.5, −12.6, 29.8 | 6.1 | 4.3-26.3 |
| | $LT_A$/CR | 11.9 | 30.0/2.5 | 78.5/6.6 | | |
| 7 | L*a*b* | 53.5, −56.9, 1.5 | 68.2, −37.2, 19 | 85.1, −11, 40 | 4 | 4.4-17.7 |
| | $LT_A$/CR | 15.7 | 34.3/2.2 | 68.6/4.4 | | |
| 1543 | L*a*b* | 42.3, −34.4, 16.3 | 56.5, −6.5, 36.9 | 68.4, 15.7, 54.6 | 3.3 | 0.7-2.3 |
| | $LT_A$/CR | 10.8 | 25.7/2.4 | 45/4.2 | | |
| 4390 | L*a*b* | 38.3, −62.2, −13.2 | 52.7, −61.9, 0.3 | 63.8, −53.7, 10.2 | 6.4 | 0.7-4.5 |
| | $LT_A$/CR | 5.8 | 14.8/2.6 | 26.4/4.6 | | |
| 398 | L*a*b* | 34.7, −46.7, −8.1 | 50.3, −30.3, 8.5 | 61.9, −11.6, 22.2 | 5.4 | 1.9-10.2 |
| | $LT_A$/CR | 5.5 | 16.3/3.0 | 30.4/5.6 | | |

Rosco 07 Pale Yellow: Photostability of chromophores may be improved if light in the UV wavelength region is attenuated. This filter provides a layer that attenuates light below about 400 nm in these wavelengths the formulation will not darken, resulting in the choice of allowing 50% of UV and short wavelength light below 400 nm and as much as light as possible thereafter. Chromophores may also switch to a dark state when stimulated with light in the ~400-420 range.

GamColor 1543 Full CTO: This filter provides a layer that attenuates all light up to about 650 nm to about 50%, and allows maximum transmission of incident light above ~650 nm, thus reducing the quantity of higher energy wavelengths incident on the switching material. By reducing the amount of light incident on the switching material, photostability may be improved, while maintaining $LT_A$ as high as possible.

Rosco 4390 CalColor 90 Cyan: Photofading is observed with some chromophores—or switching material comprising same—when exposed to light around ~650 nm. This filter has an absorption spectrum comprising a Gaussian shape with a half-height width of around 200 nm, centered about 650 nm. By attenuating light in this region of the spectrum, the photostationary state of the chromophore may be improved (a darker dark state) by preventing the photofading that occurs due to the S109 chromophore also having an absorption peak centred around 650 nm. Conversely, attenuation of light in this region may also aberrantly affect fading of switching material by reducing any photofading effect, and making the fading reaction more reliant on electrofading alone.

Rosco 398 Neutral Grey: This filter provides a layer that attenuates all light in the visible range, and has an $LT_A$ of 39%. This overall attenuation of incident light reduces the higher energy wavelengths, thus may improve photostability and/or durability of the switching material. By reduction of the overall light incident on the variable transmittance layer, overall light transmission is reduced, providing a lower $LT_A$ for a laminated glass or optical filter comprising such a layer.

Example 6: Color Balance Layer Calculation

Figure 12:
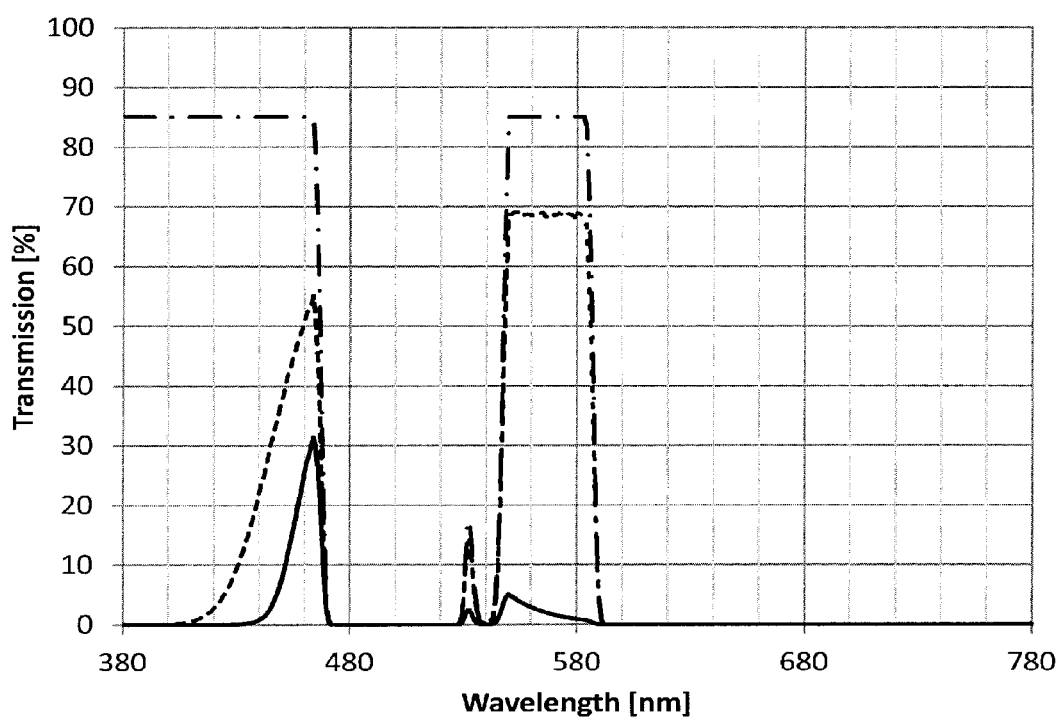
FIG. 12 shows the alteration of the spectra of a modeled 'stack' in dark and faded states with a color balance layer selected to provide a target $LT_A$ in the dark state and color in the faded state. Dark state—solid line; faded state— dotted line; color balancing layer—alternating dot/dash line, according to another embodiment.

A custom color balance layer having a spectrum with min/max bounds for $LT_A$ of 0 and 85% respectively was modeled in a optical filter with a variable transmittance layer comprising S109 (S109 spectrum illustrated in FIG. 1). The model was presented with the following parameters: $LT_A$ in the dark state of 1% and a neutral color in the faded state. Absorption peaks were iteratively introduced into the spectrum of the custom color balance layer to improve contrast ratio between dark and faded state, while maintaining the parameters. FIG. 12 shows a calculated custom spectrum of an optical filter comprising S109 and a custom color balance layer in the dark (solid line) and faded (dotted line) states; the spectrum of the modeled color balance layer is indicated by the alternating dot-dashed line. The resulting contrast ratio of the optical filter was 25.7 with an $LT_A$ in the dark state of 1% and $LT_A$ in the faded state of 25.7%. The L*a*b* of the dark state is 12, 14.1, -33.4 and for the faded state 55.9, 3.0, 3.0. The first peak located in the ~540-590 nm region provides for an improved contrast ratio due to the large spectrum difference between dark and faded states of the S109 variable transmittance layer. The peak located in the ~380-470 nm region is selected to complement the first peak and provide a neutral faded state.

This model demonstrates that it is possible to introduce additional absorption peaks may be introduced in the color balance layer in the ~500-550 nm region and/or the ~650-780 nm region may be introduced without sacrificing color neutrality in the faded state.

Example 7: Temperature and Glazing Sample Configuration

Switching material (alpha 6.1) in films encapsulated with a thermocouple were placed in a QSUN weathering chamber for 30 minutes, calibrated to black panel temperature of 70° C. The films were overlaid with tinted glass (GREYLITE™) or overlaid with GREYLITE and an infrared (IR) blocking layer (XIR 75 from Southwall). Differences in device temperature were observed—inclusion of tinted glass increased the temperature of the film (68° C.), compared to 63.6° C. for a film with GREYLITE and the IR blocking layer (63.2° C.). Inclusion of GREYLITE in a multilayer glazing may provide, at least in part, a neutral color, but without an IR blocking layer, the temperature of the switching material increases.

Example 8: Temperature and Glazing Sample Configuration

Seven 'stack' configurations comprising a variable transmittance layer and laminated with a thermocouple inboard of the variable transmittance layer. The stacks were exposed to simulated sunlight (Solar Simulator), and the temperature logged over several minutes until stabilized. The composition of the variable transmittance layer is illustrated in FIG. 13. Layer 128a: 100—PET (Melinex 454); 102—pressure sensitive adhesive (PSA 8172); 104—ITO-coated PET (ST504) with ITO coating facing 106; 106 switchable material alpha 6.2. Layer 128b has a layer of XIR72-41. Layer 128c has a layer of Gam 1514 film (grey PET film).

The stack configurations (Stacks A-G) are shown in FIG. 13, numbered components are set out in Table 7. Stacks A and B are the same, but invert the IR blocking layer 124a/b. Stacks D and E are the same, but with the IR blocking layer 124a/b incorporated into the variable transmittance layer (in place of one of the PET layers 100).

TABLE 7

| Number | Component |
|---|---|
| 120 | Grey glass - SolarGrey glass 3 mm |
| 122 | Pressure sensitive adhesive - PSA 8172 |
| 124a | IR blocking layer - XIR72-41 IR layer facing away from 128 |
| 124b | IR blocking layer - XIR72-41 IR layer facing towards 128 |
| 126 | BGR15 PVB |
| 128a | Variable transmittance layer |
| 128b | Variable transmittance layer with 124a (outboard of switching material) |
| 128c | Variable transmittance layer with 124b (outboard of switching material) |
| 128d | Variable transmittance layer with 136 (outboard of switching material) |
| 130 | Thermocouple |
| 134 | Clear glass |
| 136 | GAM 1514 (grey PET) |
| 138 | Clear glass with low-E soft coat (Solarban 70) |

Figure 14:
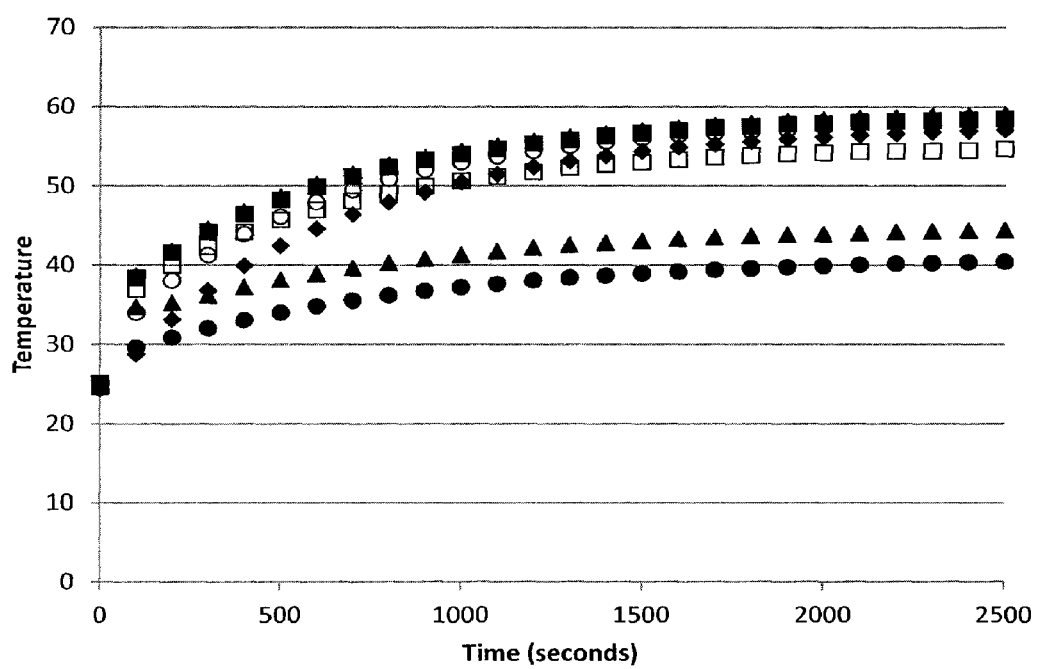
FIG. 14 shows a plot of internal temperature of the optical filters of FIG. 13 according to another embodiment. Stack A—solid diamond; stack B—solid square; stack C—solid triangle: stack D—open square: stack E—open triangle; Stack F—solid circle: Stack G—open circle.

FIG. 14 shows the temperature of each device over time when under the Solar simulator. The temperature profiles of the stacks A-G segregate generally into two groups—those with low-E coatings (stacks C and F), and those with XIR layers (stacks A, B, D and F) or control (stack G). None of the stacks comprises an air gap or evacuated space, and the low E coating on the glass in stacks C and F were internal to the stacks (the low-E coating faced the interior of stack F). These results demonstrate the ability of some infrared blocking layers to significantly influence the temperature of the interior of the stack, and thus the temperature of the switching material.

Example 9: Temperature and Fading Time

An optical filter with GreyLite II, comprising an alpha 8.4i switching material was prepared, darkened using a solar simulator (to about 2% $LT_A$), and electrofaded while maintained at 23° C., 40° C. or 60° C. (2 volts, 10 second polarity reversing cycle). Time in seconds to reach 50% PSS (11.2% $LT_A$), 10% PSS (82.5% $LT_A$), or transition from 90 to 10% PSS (19% $LT_A$ to 3.5% $LT_A$) for each temperature is set out in Table 8. The rate of electrofading increased with an increase in temperature.

TABLE 8

|  | 23° C. | 40° C. | 60° C. |
|---|---|---|---|
| 50% PSS (11.2) | 40 | 27 | 19 |
| 10% PSS (19) | 82.5 | 57 | 34.5 |
| 90 to 10% PSS (3.5 to 19) | 73 | 52 | 28.5 |

Example 10: Weathering of Test Devices at Different Temperatures

Test devices comprising 10 wt % S158 in Texanol in a glass weathering cell (50 micron thickness) were placed in a QSUN weathering chamber calibrated to a black panel temperature of 50° C., and darkening performance assessed over exposure (MJ/m² at 340 nm). After 3.1 MJ/m² of exposure, the QSUN temperature was increased to 70° C. black panel temperature, and darkening performance assessed over exposure. Percent of initial darkening performance is calculated according to equation (4):

$$\% \text{ of initial darkening} = \frac{\% T^\lambda_{light\,0} - \% T^\lambda_{dark\,i}}{\% T^\lambda_{light\,0} - \% T^\lambda_{dark\,0}} \times 100\% \quad (4)$$

For samples at the initial timepoint (0) and for subsequent timepoints (i) Transmission spectra (380-780 nm) are obtained for each device in dark and faded states initially (timepoint 0) for subsequent timepoints (i) for % transmission (% T) in the faded (light) and dark states. Transmission at wavelength λ is used for each calculation—λ is selected as the wavelength with 10% transmission in the initial dark state, determined for each device—the same λ is used for each subsequent determination of % of initial darkening. Dark state is measured on the device as it is removed from the QSUN. A faded state is achieved by irradiating the sample with a low pressure sodium lamp.

Figure 15:
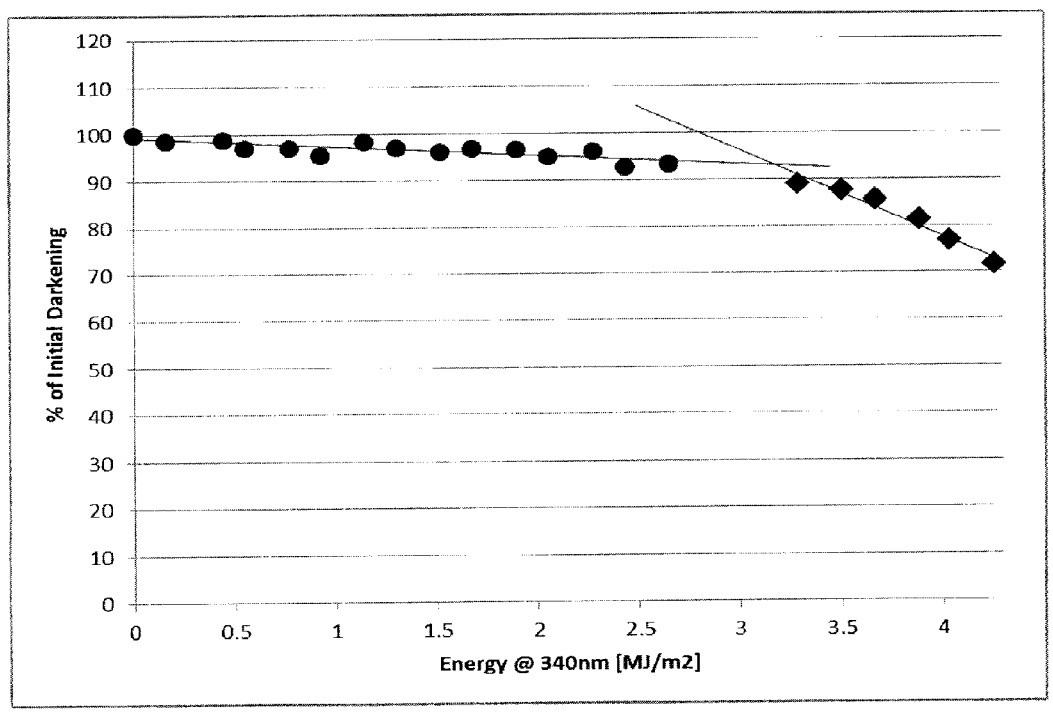
FIG. 15 shows a plot of weathering performance of test devices exposed to a QSUN Xenon arc light source with a black panel temperature set point of 50° C. and 70° C. X-axis—total energy exposure at 340 nm ($MJ/m^2$); Y axis % initial darkening performance. Solid circles—weathering at 50° C. (slope Y=−1.938x+99.131); solid diamonds—weathering at 70° C. (slope Y=−18.612+152.2), according to another embodiment.

FIG. 15 illustrates the rate of change of darkening from the initial state for devices held at 50° C. and 70° C. Samples held at elevated temperature demonstrate an accelerated rate of degradation (as measured by a decrease in the darkening performance over exposure).

The weathering performance of test devices is shown to decrease at elevated temperature.

Example 11: Weathering Performance of Test Devices with UV Blockers

Figure 16A:
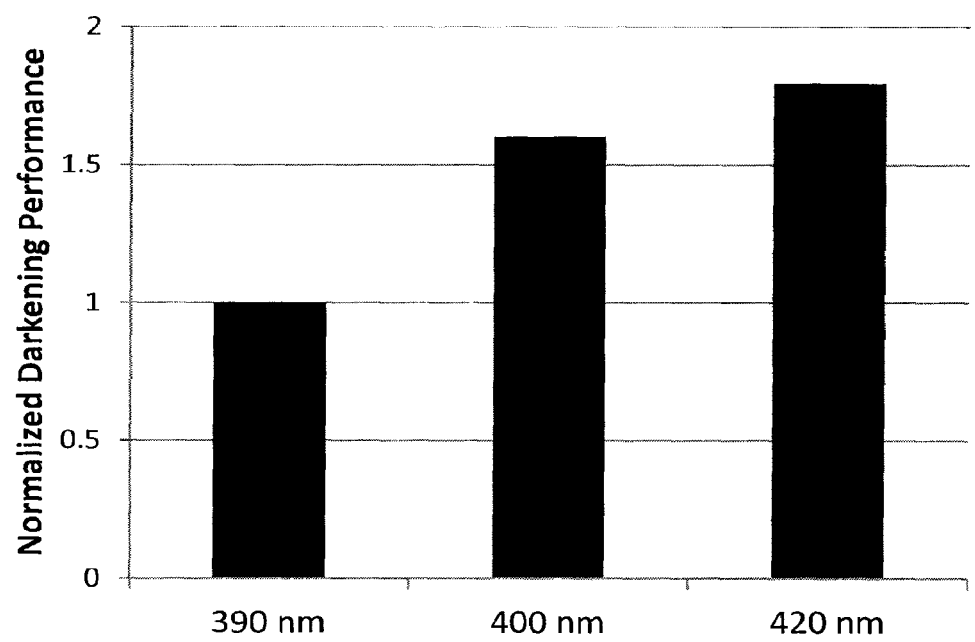
FIG. 16A shows a bar graph of darkening performance of alpha 6.1f PVB laminated test devices exposed to a QSUN Xenon arc light source with a black panel temperature set point of 70° C. with a UV blocking layer of specified cutoff wavelength, normalized to the darkening performance for the test specimen with a UV blocking layer with a 390 nm cutoff (50%+/−6 nm).

Higher energy light (including higher energy VIS and UV light) darkens switching materials. PVB laminated test specimens (devices) with alpha 6.1f formulation were placed in a QSUN weathering chamber calibrated to a black panel temperature of 70° C. FIG. 16A, B show the weathering performance of devices comprising various UV blocking layers with 390, 400 or 420 nm cutoff wavelength (blocking 50% or more of wavelengths below the cutoff). Darkening performance decreases significantly faster for samples with a UV blocking layer having a lower cutoff wavelength, and blocking of higher energy light increases the darkening performance over time. Surprisingly, samples continued to darken even with a 400 nm or 420 nm cutoff filter. Because the chromophores used in the test device were initially believed to require UV light to darken, it was unexpected that photoactivated darkening is maintained even when blocking light up to 420 nm.

Example 12: UV Cutoff Filters, Darkening Time and Photostationary State of Variable Transmittance Optical Filters Studies were performed on a 1.2 mil (unlaminated) film with a formulation containing 15% S158, 10% Mowitol B60HH, 3% Butvar B72, 0.35% hexamethylene diisocyanate, 0.01% ZnOct, 1% TBATFSI, 63.64% diethyl succinate, and 7% 1,2-butylene carbonate. The film was coated onto a sheet of ST504 using a 4 mil gap. The film was faded for 3 minutes with visible light from a low-pressure sodium lamp, then positioned on a stage and exposed continuously to simulated sunlight. Transmission spectra recorded at 0.5 s intervals using an Ocean Optics detector positioned beneath a hole in the stage, opposite the Solar Simulator light source, with or without cutoff filters positioned between the light source and the film. Spectra were recorded until fluctuations in the transmission measurements were no longer significant. Cutoff filters (50%+/−6 nm): 370 nm, 400 nm, 420 nm, 435 nm and a 455 nm. Table 9 sets out the L*a*b* (comma separated values) in the dark and faded states, and $LT_A$ at the dark (PSS) faded and intermediary states for each optical filter comprising the S158 switching material and cutoff filter as indicated. With increasing blocking of the UV and higher energy visible wavelengths, the ability of the film to achieve a fully dark state is not hindered until the 455 nm filter is applied. With inclusion of the 455 nm filter, the equilibrium between ring-open and ring closed states of the chromophore in the switching material is shifted, and a prominent change in the b* value is observed. The light transmittance at 10, 50 or 90% PSS does not differ greatly for samples 1-5, however an increase in the light transmittance at 90% PSS (less absorbance) is noted for sample 6. The time to transition (90-10% PSS) increases with blocking of longer wavelength light.

TABLE 9

Characterization of test samples with or without selected cutoff filters.

| | Test Sample | | | | | |
|---|---|---|---|---|---|---|
| | 1 | 2 | 3 | 4 | 5 | 6 |
| Filter | no filter | 370 nm | 400 nm | 420 nm | 435 nm | 455 nm |
| Faded $LT_A$ (0% PSS) | 71.5 | 71.5 | 71.5 | 71.5 | 71.5 | 71.5 |
| L*a*b* faded | 87.3, −23.2, 64.7 | 82.6, −25.9, 57.2 | 84.3, −22.3, 60.8 | 86.8, −17, 71.2 | 85.8, −17.4, 66.6 | 86.9, −17.5, 72.4 |
| Dark $LT_A$ (100% PSS) | 11.8 | 12.9 | 13.3 | 13.7 | 14.4 | 20.0 |
| L*a*b* dark | 48.8, −74.9, 9.1 | 49.9, −70, 9.9 | 50.4, −69.5, 11.7 | 50.6, −68.7, 14.2 | 51.5, −67.8, 15 | 57.2, −64.7, 27 |
| $LT_A$ at 50% PSS | 41.6 | 42.2 | 42.4 | 42.6 | 42.9 | 45.7 |
| $LT_A$ at 10% PSS | 65.5 | 65.6 | 65.6 | 65.7 | 65.7 | 66.3 |
| $LT_A$ at 90% PSS | 17.8 | 18.7 | 19.1 | 19.5 | 20.1 | 25.1 |
| Time (seconds) to 50% PSS | 3 | 3 | 4 | 5 | 5.5 | 8 |
| Time (seconds) 90-10% PSS | 19.5 | 24.5 | 27.5 | 32 | 35.5 | 43 |

TABLE 10

Time (seconds) for test samples 2-6 to achieve 50% PSS or transition from 90%-10-% PSS of Sample 1.

| | Test sample | | | | | |
|---|---|---|---|---|---|---|
| | 1 | 2 | 3 | 4 | 5 | 6 |
| Filter | no filter | 370 nm | 400 nm | 420 nm | 435 nm | 455 nm |
| Time to 50% PSS of #1 (no filter) | 3 | 3.5 | 4 | 5.5 | 6 | 11 |
| Time to 90-10% PSS of no Filter | 19.5 | 27 | 33 | 40.5 | 50 | N/A |

Table 10 sets out the time for the test samples 2-6 to achieve the 50% PSS of sample 1, and the time to transition from 90% to 10% PSS of the unfiltered sample (sample 1). With blocking of longer wavelength light, the time to attain the same PSS as a film with no filter increases substantially, and for test sample 6, the PSS can't be reached.

These data demonstrate that the light transmittance of the dark state of an optical filter, and the transition time of an optical filter, can be adjusted, at least in part, by selective blocking of longer wavelength UV light, shorter wavelength visible light, or both.

Figure 17:
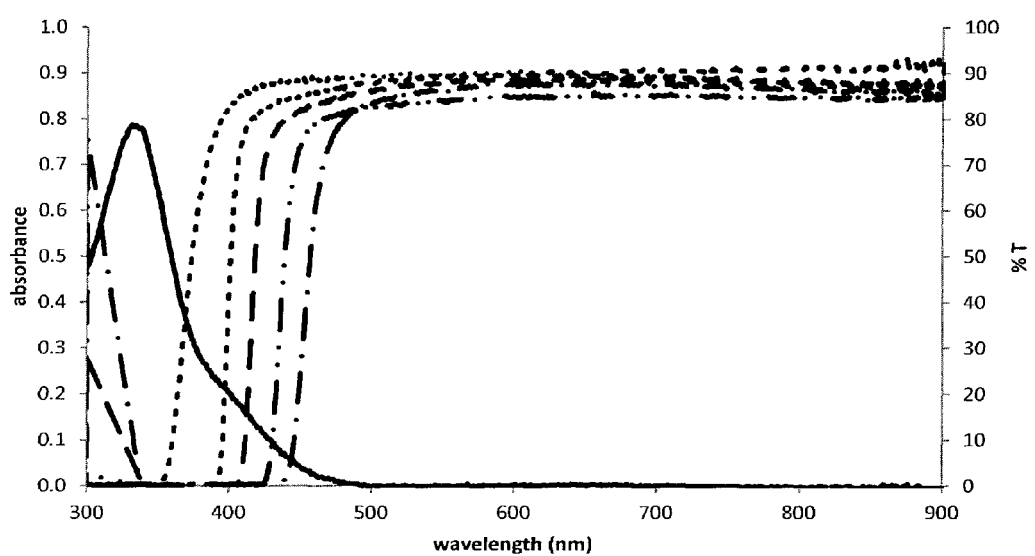
FIG. 17 shows a plot of chromophore S158 absorbance (solid line) (left side Y axis; transmittance right side Y axis) for various wavelengths of light. A series of cutoff filters (50%+/−6 nm) at 370 nm (dashed line), 400 nm (dotted line), 420 nm (long dashed line), 435 nm (long dash, 2 dots line) and 455 nm (long dash-dot line), according to another embodiment.
Figure 18:
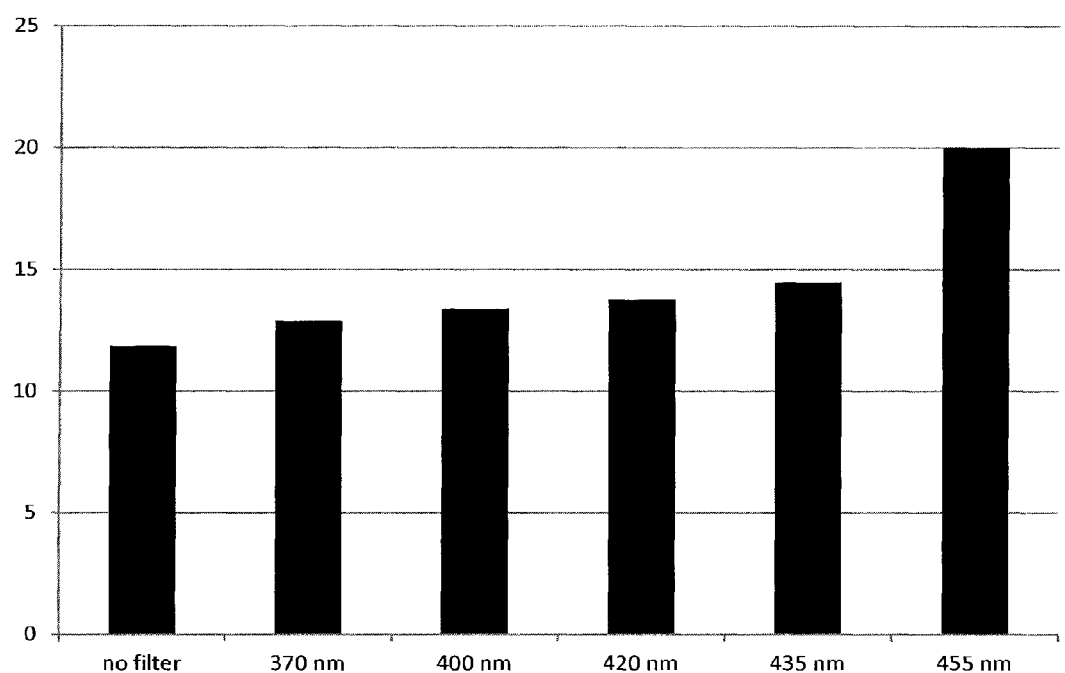
FIG. 18 shows a bar graph of the minimum light transmittance in dark state in the absence or presence of cutoff filters, according to another embodiment.
Figure 19:
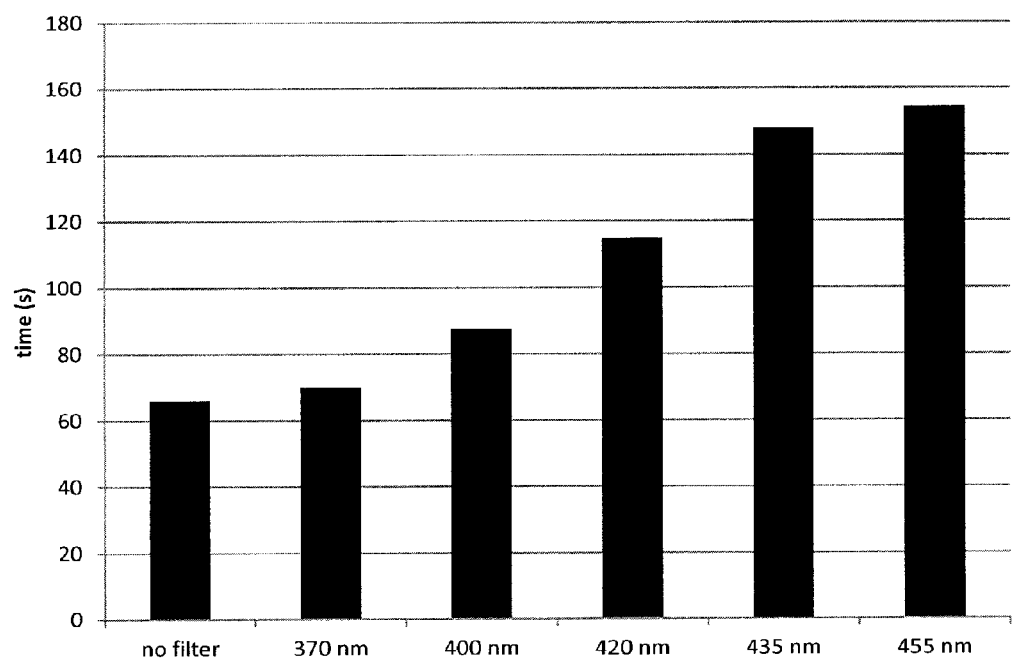
FIG. 19 shows a bar graph of the time to reach minimum light transmittance in the absence or presence of cutoff filters, according to another embodiment.

FIG. 17 shows a ring-open absorption curve for S158, overlaid with the transmission curves for the cutoff filters. Light of lower energy (higher wavelength) than the indicated cutoff wavelength of the filters shown (non-filtered light) is able to darken a film containing chromophore S158 despite the very low absorbance at these unfiltered wavelengths relative to the absorbance at lambda max of S158 (335 nm—absorbance peak of solid black line in FIG. 17), and has very little effect on the dark state achieved. FIG. 18 shows, surprisingly, that extent of darkening is not significantly reduced by the use of cutoff filters of 435 nm or below, but darkening time is increased (FIG. 19 with filters of increasing cutoff wavelength above 370 nm. Light filters with higher cutoff wavelengths may decrease the amount of the S158 ring-closed isomer present at the photostationary state (PSS) and increase the time required to reach the PSS.

Example 13: Impact Testing

Impact testing according to ANSI Z26.1 was conducted—a 27 g ball drop from 10 m (30 ft), a 227 g dart drop from 10 m (30 ft), and a 2.26 kg ball drop from 4 m (13 ft). The three drop tests were performed on laminated 30 cm×30 cm samples containing as a variable transmittance layer a film with alpha 5 switching medium, and layers according to Stack F, absent the thermocouple, and substituting clear glass for the SolarGrey. Samples were laminated using a Carver press, or in an autoclave. In none of the tests did the ball or dart pass through any of the samples. No large pieces detached from any of the samples. All the samples tested passed the impact tests according to the regulations.

Example 14: Boil Testing

Boil testing according to ANSI Z26.1 was conducted on 100×100 mm laminated glass samples, containing as a variable transmittance layer a film with alpha 5 switching medium, and layers according to Stack F, absent the thermocouple, and substituting clear glass for the SolarGrey. Samples were laminated using a Carver press, or in an autoclave. The ability to electrofade samples from 90% PSS to 10% PSS before, and after boil testing was unaffected with boiling, and LTA remained unaffected (Table 11).

TABLE 11

| | Faded $LT_A$ | Dark $LT_A$ |
|---|---|---|
| Before Boil Test | 75.8 | 7.2 |
| After Boil Test | 75.8 | 6.6 |

Example 15: Optical Filter for an Automotive Glazing

Figure 16B:
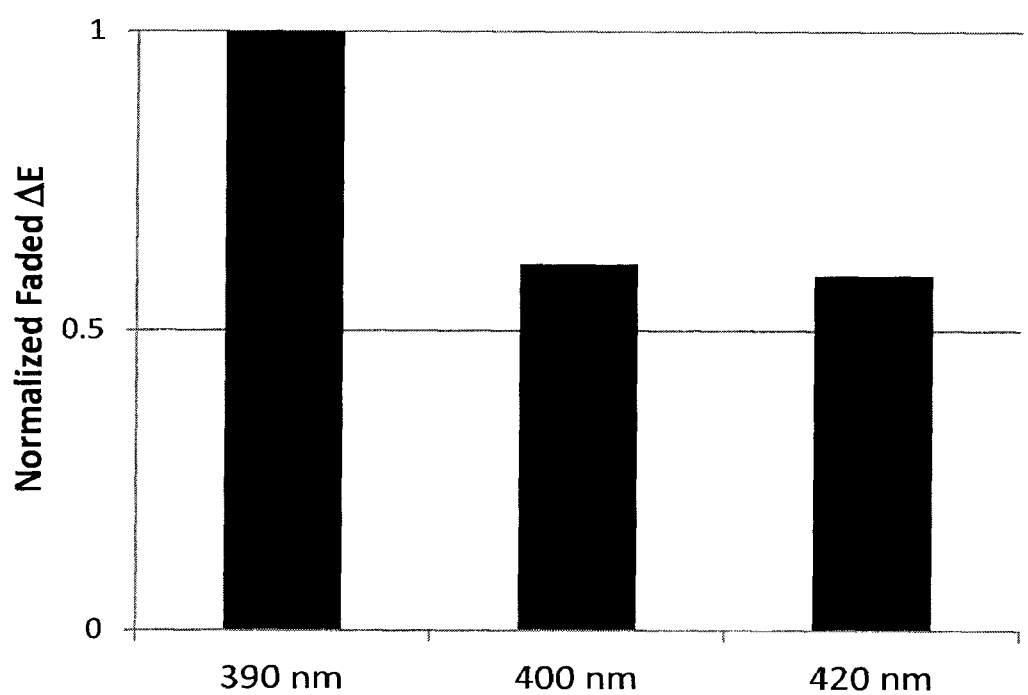
FIG. 16B shows a bar graph of the delta E of the faded state for the same set of test devices. The delta E values were normalized to the failure point (80% of initial darkening performance) of the test specimen with a 390 nm cutoff filter (50%+/−6 nm), according to another embodiment.

In an embodiment where an optical filter is used in an automotive glazing, it may be desirable to maximize weathering durability and contrast ratio while minimizing $LT_A$ in the dark state, and minimizing the time to fade with constant sunlight exposure. For an optical filter comprising a switching material with chromophore S158, a UV blocking layer with UV cutoff wavelength of 435 nm may be selected. Such an optical filter has been demonstrated to show no significant deterioration in the dark state $LT_A$ achieved (Example 12 and FIG. 18), and darkening time is maximized (Example 12 and FIG. 19). A minimal time for electrofading is preserved, and the filtering of more UV light and higher energy visible light improves the weathering performance (Example 11 and FIGS. 16A and 16B), which allows for faster fading in the presence of sunlight due to the competition in darkening kinetics and electrofading kinetics or net fading kinetics or fading occurs to a greater extent in examples where incomplete fading occurs in the presence of sunlight due to the described kinetics competition.

Other Embodiments

It is contemplated that any embodiment discussed in this specification can be implemented or combined with respect to any other embodiment, method, composition or aspect, and vice versa.

The present invention has been described with regard to one or more embodiments. However, it will be apparent to persons skilled in the art that a number of variations and modifications can be made without departing from the scope of the invention as defined in the claims. Therefore, although various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way. Numeric ranges are inclusive of the numbers defining the range. In the specification, the word "comprising" is used as an open-ended term, substantially equivalent to the phrase "including, but not limited to," and the word "comprises" has a corresponding meaning. As used herein, the singular forms "a", "an" and "the" include plural referents unless the context clearly dictates otherwise. Citation of references herein shall not be construed as an admission that such references are prior art to the present invention, nor as any admission as to the contents or date of the references. All publications are incorporated herein by reference as if each individual publication was specifically and individually indicated to be incorporated by reference herein and as though fully set forth herein. The invention includes all embodiments and variations substantially as hereinbefore described and with reference to the examples and drawings.

Unless defined otherwise, all technical and scientific terms used herein have the same meaning as is commonly understood by one of ordinary skill in the art to which this invention belongs. If a definition set forth in this section is contrary to or otherwise inconsistent with a definition set forth in the documents that are herein incorporated by reference, the definition set forth herein prevails over the definition that is incorporated herein by reference.

What is claimed is:

1. An optical filter comprising:
   (a) a variable transmittance layer having a first spectrum in a dark state, and a second spectrum in a faded state; and
   (b) a polymer color balancing layer having a third spectrum, wherein the variable transmittance layer and the color balancing layer are laminated together and comprise part of a stack;
   (c) each of the first, second and third spectra comprising a visible portion;
   (d) the first and third spectra combining to provide a dark state spectrum approximating a dark state target color; and
   (e) the second and third spectra combining to provide a faded state spectrum approximating a faded state target color.

2. The optical filter of claim 1 further comprising a first glass layer that comprises part of the stack, wherein the variable transmittance layer and the color balancing layer are laminated to the first glass layer.

3. The optical filter of claim 2 further comprising a second glass layer that comprises part of the stack, wherein the variable transmittance layer and the color balancing layer are laminated to the second glass layer.

4. The optical filter of claim 1 wherein the color balancing layer comprises polyvinyl butyral (PVB).

5. The optical filter of claim 1 further comprising an ultraviolet (UV) blocking layer.

6. The optical filter of claim 5 wherein the UV blocking layer has a cutoff wavelength of about 435 nm or less.

7. The optical filter of claim 1 further comprising a light-attenuating layer.

8. The optical filter of claim 1 wherein the variable transmittance layer comprises a switching material transitionable from a faded state to a dark state when exposed to electromagnetic radiation, and from a dark state to a faded state with application of a voltage.

9. The optical filter of claim 8 wherein the electromagnetic radiation is UV light.

10. The optical filter of claim 8 wherein the electromagnetic radiation has a component with a wavelength of 450 nm or less.

11. The optical filter of claim 8 wherein the voltage applied is from about 1.1 to about 2.5 V.

12. The optical filter of claim 1 further comprising an infrared (IR)-blocking layer.

13. The optical filter of claim 1 comprising any one or more of:
   a. an LTA in a dark state of less than about 15%;
   b. an LTA in a faded state of greater than about 5%; and
   c. a contrast ratio of at least 5.

14. The optical filter of claim 1 comprising a light transmission value of 1% or less in the dark state and 6% or higher in the light state.

15. The optical filter of claim 1 comprising a light transmission value of 5% or less in the dark state and 15% or higher in the light state.

16. The optical filter of claim 1 wherein the target color of the dark state and color of the optical filter in the dark state provide a delta C value of from about 0 to about 20.

17. The optical filter of claim 1 wherein the target color of the dark state and color of the optical filter in the dark state provide a delta E value of from about 0 to about 20.

18. The optical filter of claim 1 wherein the target color of the faded state and color of the optical filter in the faded state provide a delta C value of from about 0 to about 20.

19. The optical filter of claim 1 wherein the target color of the faded state and color of the optical filter in the faded state provide a delta E value of from about 0 to about 20.

20. A device comprising the optical filter of claim 1, wherein the device is a laminated glass, an ophthalmic device, an automotive glazing product or an architectural glazing product.

* * * * *